(12) United States Patent
Wathen et al.

(10) Patent No.: US 10,921,247 B2
(45) Date of Patent: Feb. 16, 2021

(54) MULTI-CHANNEL COHERENT DETECTION

(71) Applicant: The Johns Hopkins University, Baltimore, MD (US)

(72) Inventors: Jeremiah J. Wathen, Annapolis, MD (US); Scott M. Hendrickson, Baltimore, MD (US); Tomasz M. Kott, Baltimore, MD (US); David W. Blodgett, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/545,154

(22) Filed: Aug. 20, 2019

(65) Prior Publication Data

US 2020/0072746 A1 Mar. 5, 2020

Related U.S. Application Data

(60) Provisional application No. 62/723,551, filed on Aug. 28, 2018.

(51) Int. Cl.
*G01B 9/02* (2006.01)
*G01N 21/47* (2006.01)

(52) U.S. Cl.
CPC ... *G01N 21/4788* (2013.01); *G01N 2021/479* (2013.01); *G01N 2021/4792* (2013.01)

(58) Field of Classification Search
CPC combination set(s) only.
See application file for complete search history.

(56) References Cited

U.S. PATENT DOCUMENTS

| 2013/0100456 A1* | 4/2013 | Yu | G01B 9/02082 356/479 |
| 2018/0224266 A1* | 8/2018 | Perea | G01B 9/02032 |

OTHER PUBLICATIONS

Speckle pattern polarization analysis as an approach to turbid tissue structure monitoring, Proc. SPIE 2981, Coherence Domain Optical Methods in Biomedical Science and Clinical Applications, (May 22, 1997) (Year: 1997).*
Kirkendall, Clay K., et al., "Overview of High Performance Fibre-optic Sensing", J. Phys. D: Appl. Phys. 37 (2004) R197-R216.
Weeks, Arthur R., et al., "Experimental verification and theory for an eight-element multiple-aperture equal-gain coherent laser receiver for laser communications", Applied Optics, vol. 37, No. 21, pp. 4782-4788, Jul. 20, 1998.

* cited by examiner

*Primary Examiner* — Tarifur R Chowdhury
*Assistant Examiner* — Jonathon Cook
(74) *Attorney, Agent, or Firm* — Sung T. Kim

(57) ABSTRACT

An optical receiver is provided that includes an array of photoreceivers. Each photoreceiver may be configured to receive a respective portion of a speckle pattern generated by interaction between an object beam and a scattering medium and each photoreceiver may be configured to generate respective electrical detection signals for provision to processing circuitry for summing of the electrical detection signals. A photoreceiver may include a collector, first detector and second detectors, and first and second optical splitters. The photoreceiver may be configured to generate a first electrical detection signal and a second electrical detection signal based on a received portion of the speckle pattern.

20 Claims, 11 Drawing Sheets

MULTI-CHANNEL COHERENT DETECTION

CROSS-REFERENCE TO RELATED APPLICATIONS

This application claims the benefit of U.S. Provisional Patent Application No. 62/723,551 filed on Aug. 28, 2018, the entire contents of which are hereby incorporated herein by reference.

TECHNICAL FIELD

Example embodiments generally relate to optical detection technologies and, in particular, relate to coherent optical detection.

BACKGROUND

Light scattering media are present in a vast number of optical applications and create issues with the operation of systems that rely on the propagation of light through the medium. As light waves pass through a scattering medium, which may be referred to as a highly-scattering medium or a multiple-scattering medium, the light waves are refracted or reflected and may scatter multiple times within the medium before being transmitted through the medium or reflected out of the medium. Such a scattering medium can take a number of different forms in a variety of applications. For example, the Earth's atmosphere may be such a scattering medium and affect light received from distant stars. Additionally, skin and soft tissue (e.g., brain tissue) may be a scattering medium that causes light to scatter when attempting to image bones and organs or detect movement or other activity internal to the body.

When light is scattered by such a medium, speckle patterns of light can be formed as the light is output from the medium. The reflections and refractions within the scattering medium cause changes in the amplitude and phase of the input light. Interference between the light at the differing amplitudes and phases within the medium can result in varying changes in intensity of the output from the medium, thereby creating the speckle pattern. In some systems, this speckle pattern may be received by a detector that is configured to receive the light for analysis. This scattering of the light within the medium in combination with other environmental factors can also increase the noise in a signal that interacts with the medium. As such, light signals that are passed through a scattering medium not only form a speckle pattern at the output, but can also suffer from having a low signal-to-noise ratio (SNR) at the output.

A common method to improve the SNR is to implement coherent detection. Coherent detection is an interferometric type of detection where the desired signal field (i.e., the speckle field at the output of the scattering medium) is mixed with a pristine optical-local-oscillator field at the detector. The local oscillator is typically a coherent plane wave derived from the same light source (e.g., laser) used to illuminate the scattering medium. Coherent detection is beneficial because, in the small signal regime, the SNR exhibits gain proportional to the field strength of the local oscillator. The SNR can therefore be improved simply by increasing the strength of the local oscillator. The SNR scales with the strength of the local oscillator until the photon flux arriving at the detector is sufficient to place the detection in the shot noise limit. In the shot noise limit, the dominant noise mechanism is due to the Poisson statistics related to the likelihood of conversion of a photon to an electric charge carrier in the detector. Therefore, when trying to detect a weak speckle field, coherent detection can be used by increasing the strength of the local oscillator until the detection is placed in the shot noise limit, because this optimizes the SNR.

There is an additional constraint associated with shot-noise-limited coherent detection in that the power of both the signal and the noise scale together with the square root of N, where N is the number of speckle being received by a photodetector. As such, a problem exists with respect to being able to distinguish the signal from the noise in a received speckle pattern due to the low SNR. One might contemplate simply increasing the area of the detector surface in an attempt to increase the amount of signal received in order to improve the SNR. However, since the noise and the signal scale together as mentioned above, increasing an area of the photodetector does not operate to improve the SNR. Similarly, attempting to focus more of the speckle pattern onto a detector area using optics also does not operate to improve the SNR.

BRIEF SUMMARY OF SOME EXAMPLES

According to some example embodiments, a system is provided. The system may comprise a light source configured to output light and an optics assembly configured to receive the light from the light source and output a reference beam and an object beam. In this regard, the reference beam or the object beam may be modulated and the object beam may be directed to a scattering medium for interaction with the scattering medium to generate a speckle pattern. The system may further comprise processing circuitry and an optical receiver. The optical receiver may comprise an array of photoreceivers including a first photoreceiver. Each photoreceiver in the array of photoreceivers may be configured to receive a respective portion of the speckle pattern and generate respective electrical detection signals for provision to the processing circuitry. The processing circuitry may be configured to perform a summing operation based on the respective electrical detection signals to generate an output signal for analysis. The first photoreceiver may comprise a collector, a first detector, and a second detector. The collector may be configured to receive a first portion of the speckle pattern. The first photoreceiver may further comprise a first splitter configured to mix the first portion of the speckle pattern at a first polarization with the reference beam to generate first optical signals for receipt by the first detector. In this regard, the first detector may be configured to generate a first electrical detection signal based on the first optical signals for provision to the processing circuitry. The first photoreceiver may further comprise a second splitter configured to mix the first portion of the speckle pattern at a second polarization with the reference beam to generate second optical signals for receipt by the second detector. In this regard, the second detector may be configured to generate a second electrical detection signal based on the second optical signals for provision to the processing circuitry. The first electrical detection signal and the second electrical detection signal may be included in the respective electrical detection signals for provision to the processing circuitry.

According to some example embodiments, an optical receiver is provided. The optical receiver may comprise an array of photoreceivers including a first photoreceiver. In this regard, each photoreceiver may be configured to receive a respective portion of a speckle pattern generated by interaction between an object beam and a scattering medium and generate respective electrical detection signals for provision to processing circuitry for summing. The optical receiver may be configured to receive a reference beam and the speckle pattern. The first photoreceiver of the array of photoreceivers may comprise a collector, a first detector, and a second detector. The collector may be configured to receive a first portion of the speckle pattern. The first photoreceiver may further comprise a first optical splitter configured to mix the first portion of the speckle pattern at a first polarization with the reference beam to generate first optical signals for receipt by the first detector. In this regard, the first detector may be configured to generate a first electrical detection signal based on the first optical signals for provision to the processing circuitry. The first photoreceiver may further comprise a second optical splitter configured to mix the first portion of the speckle pattern at a second polarization with the reference beam to generate second optical signals for receipt by the second detector. The second detector may be configured to generate a second electrical detection signal based on the second optical signals for provision to the processing circuitry. The first electrical detection signal and the second electrical detection signal may be included in the respective electrical detection signals for provision to the processing circuitry.

According to some example embodiments, an example method is provided. The example method may comprise receiving light from a light source and outputting a reference beam and an object beam from an optical assembly, where the reference beam or the object beam may be modulated. The example method may further comprise directing the object beam to a scattering medium for interaction with the scattering medium to generate a speckle pattern, receiving a respective portion of the speckle pattern at one or more photoreceivers of an array of photoreceivers of an optical receiver, and generating respective electrical detection signals by each of the photoreceivers for provision to processing circuitry. Further, the example method may comprise performing a summing operation based on the respective electrical detection signals to generate an output signal for analysis. In this regard, generating the respective electrical detection signals for a first photoreceiver of the array of photoreceivers may comprise receiving a first portion of the speckle pattern at a collector of the first photoreceiver, mixing the first portion of the speckle pattern at a first polarization with the reference beam to generate first optical signals, and receiving the first optical signals at a first detector of the first photoreceiver. Generating the respective electrical detection signals may further comprise generating, by the first detector, a first electrical detection signal based on the first optical signals, mixing the first portion of the speckle pattern at a second polarization with the reference beam to generate second optical signals, receiving the second optical signals at a second detector of the first photoreceiver, and generating, by the second detector, a second electrical detection signal based on the second optical signals. The first electrical detection signal and the second electrical detection signal may be included in the respective electrical detection signals for provision to the processing circuitry.

BRIEF DESCRIPTION OF THE SEVERAL VIEWS OF THE DRAWING(S)

Having thus described some embodiments in general terms, reference will now be made to the accompanying drawings, which are not necessarily drawn to scale, and wherein:

DETAILED DESCRIPTION

Figure 1:
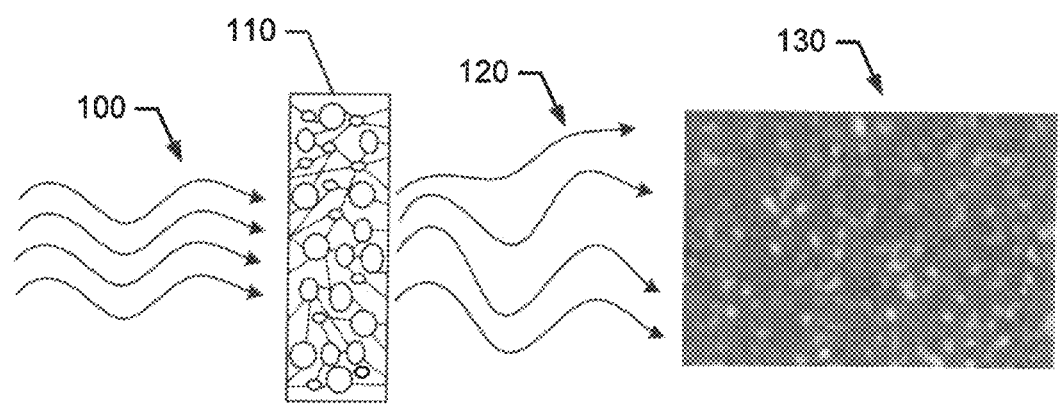
FIG. 1 is an illustration of an optical wave passing through a scattering medium.

Some example embodiments will now be described more fully with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

According to some example embodiments, systems, apparatuses, and methods are described herein that employ an optical receiver comprising an array of photoreceivers configured to receive portions of a speckle pattern thereby allowing the portions of the speckle pattern to be separately addressed for subsequent coherent summing. As such, according to some example embodiments, the optical receiver may be configured to operate as a coherent optical receiver. According to some example embodiments, the size and spacing of the collectors of the photoreceivers within the array may be on a scale of a diameter of a speckle of the speckle pattern for a particular implementation and application. As further described below, such an array of photoreceivers may be used to reduce or overcome issues with receiving a speckle pattern output from a scattering medium having a low SNR. To do so, according to some example embodiments, each photoreceiver may generate respective electrical detection signals that may be, for example, coherently summed to generate an output having extracted amplitude and phase information associated with the scattering medium at an improved SNR to allow for further analysis in a variety of applications.

The implementation of an array of photoreceivers as mentioned above and described in further detail below, may, according to some example embodiments, be embodied on a single photonic semiconductor chip in order to provide for a compact, miniature solution that may be utilized in numerous applications that can leverage such a small scale implementation. An advantage of a single chip implementation is that, within the limits of the chip's surface area, the number of collectors for the photoreceivers may be increased to an arbitrarily large number for a given application, for example, without incurring additional cost in fabrication, because, in general, the cost of chip-fabrication is independent of density of collectors or photodiodes integrated into the chip.

To provide additional context with respect to a scattering medium and the effects on a signal interacting with a scattering medium, FIG. 1 provides an illustration of an optical input wave 100 passing through a scattering medium 110. The optical input wave 100 may be provided by a variety of sources for the purpose of, for example, performing optical imaging. Example sources for the optical input wave 100 may include light from a star, a light wave from a laser (e.g., single frequency laser), or another light generating device that may be used to, in this example, illuminate through the scattering medium 110. As shown in FIG. 1, the optical input wave may be provided in a transmission configuration to, for example, image internal features of a body such as organs, muscles, tendons, ligaments, or the like. The scattering medium 110 may therefore be, for example, biological tissue (e.g., bone), turbid water, or the like. As such, the optical input wave 100 may be directed to interact with the scattering medium 110, which may be an object (e.g., a scattering object) that causes multiple internal scattering events in the form of reflections or refractions within the scattering medium 110 as the optical input wave 100 is affected by the scattering medium 110.

As the optical input wave 100 exits the scattering medium 110, a scattered wave 120 is formed. Due to the scattering events within the scattering medium 110, the scattered wave 120 may be split into multiple modes of light having differing paths, phases, and amplitudes. Due to the various modes of light introduced by interaction with the scattering medium 110, if the scattered wave 120 is directed to a planar surface, such as the receiving surface of an optical receiver, the scattered wave 120 creates a speckle pattern 130. The speckle pattern 130 may be caused by the multiple modes of light of the scattered wave 120 interfering with each other both constructively and destructively.

Despite appearing to be quite random, the resulting speckle pattern 130 includes valuable properties and information that can be exploited in order to compensate for the effects of the scattering medium 110 on the optical input wave 100. In this regard, for example, the speckle pattern 130 retains correlations in time, space, and optical frequency. Stated differently, the speckle pattern, or aspects of the speckle pattern, may remain stationary over certain time, length, and optical wavelength variations.

Further, the speckle pattern may be comprised of a plurality of speckles that have measurable characteristics with respect to, for example, the "size" of each speckle. In this regard, for example, the size of the speckles may be based on a wavelength of the optical input wave 100, a size (e.g., cross-sectional area) of a beam of the optical input wave 100, and a distance between the scattering medium 110 and the surface upon which the speckle pattern is formed for detection. More specifically, in the first order, the average speckle diameter may be defined as $\lambda * z/d$, where $\lambda$ is the wavelength, z is the distance from the scattering medium 110 to the detector, and d is the optical input wave 110 beam diameter. Based on these parameters, various characteristics may be determined, such as, a character size of a speckle, an inter-speckle separation distance, and a speckle diameter. Due to variations in the speckle pattern, a size of a speckle, an inter-speckle separation distance, or a speckle diameter may be defined by an average or mean value based on measurements taken for a given application.

Figure 2:
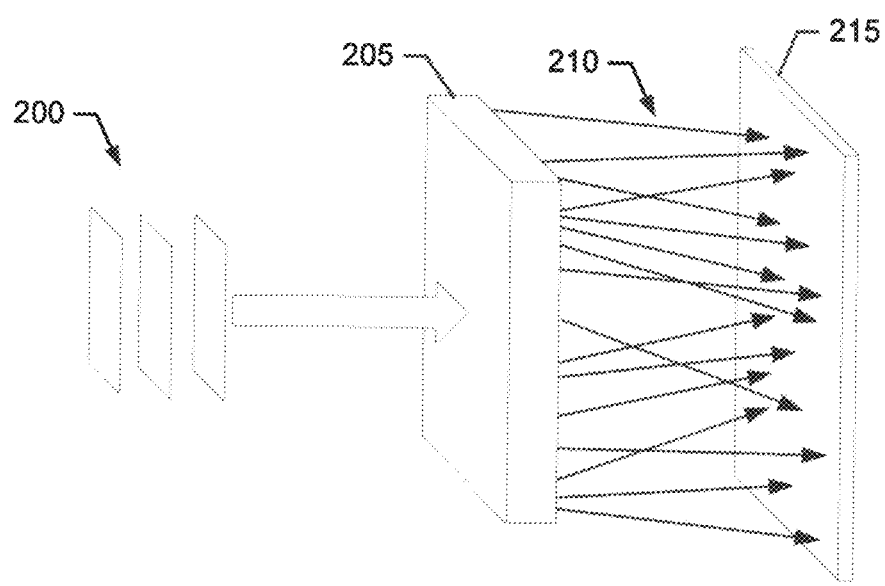
FIG. 2 is an illustration of an optical wave shown as a series of planes of an optical wavefront passing through a scattering medium according to some example embodiments.

Similar to FIG. 1, FIG. 2 provides another illustration of an optical wave passing through a scattering medium. In this regard, the optical input wave 200 is depicted as a series of planes of an optical wavefront propagating to and through a scattering medium 205. The scattering medium 205 may be the same or similar to the scattering medium 110, described above with respect to FIG. 1. As shown in FIG. 2, when the optical input wave 200 exits the scattering medium 205, multiple interfering paths of light 210 are formed that are received by the planar surface 215. Due to refractions and reflections of light within the scattering medium 205 and the interference that occurs within and after leaving the scattering medium 205, a speckle pattern may be formed on the planar surface 215.

Figure 3:
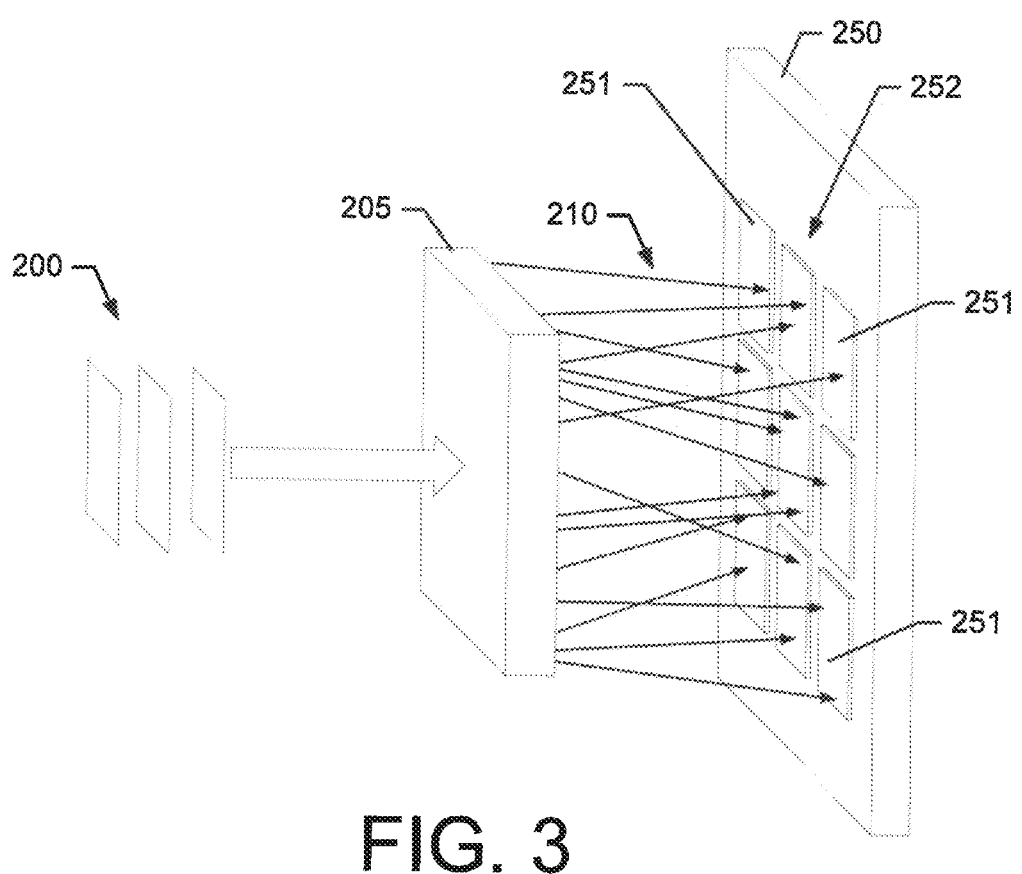
FIG. 3 is an illustration of an optical wave shown as a series of planes of an optical wavefront passing through a scattering medium to form a speckle pattern on a photoreceiver array according to some example embodiments.

However, as shown in FIG. 3, rather than having the paths of light 210 output from the scattering medium 205 be incident upon a planar surface of for example, a singular collector, according to some example embodiments, an array of smaller collectors 251 for respective photoreceivers may be distributed across the planar surface 252 of an optical receiver 250. As such, portions of the speckle pattern may be incident upon each of the collectors 251, and the light received at each of the collectors 251 may be received and converted into electrical signals by the associated photoreceivers, for example, for coherent summing to determine amplitude and phase information with an improved SNR as further described herein. In this regard, the collectors 251 may be disposed in a grid configuration, where the size and spacing (e.g., pitch) of the collectors 251 may be defined based on characteristics of the speckle pattern, such as, for example, the size of a speckle, an inter-speckle separation distance, or a speckle diameter, which may be average or mean values.

Figure 4:
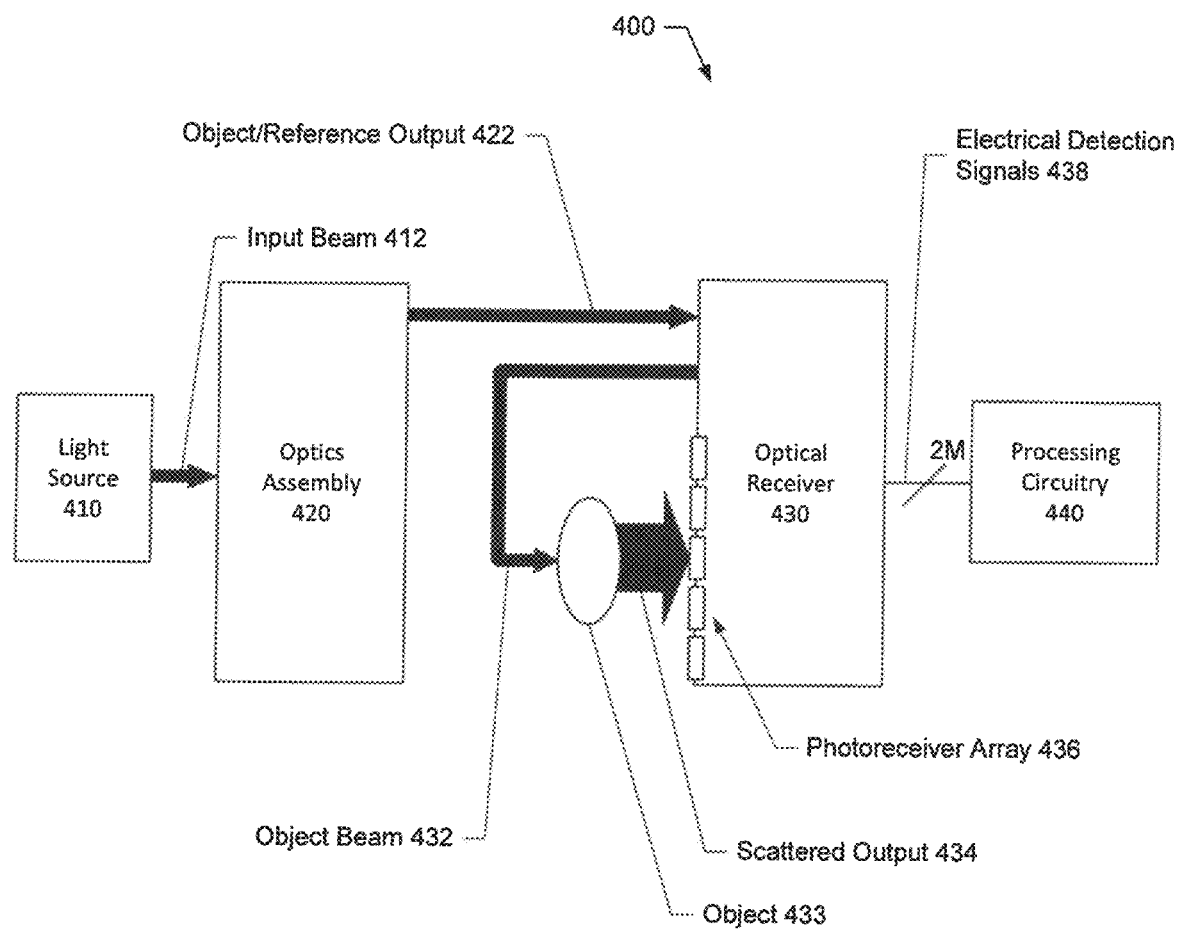
FIG. 4 is a block diagram of an imaging system according to some example embodiments.

Having described the implementation and use of an array of photoreceivers and associated collectors in general terms, FIG. 4 provides a high-level block diagram of an imaging system 400 that includes a photoreceiver array 436 that may include an array of collectors that are the same or similar to the array of collectors 251 described above. The imaging system 400 may comprise a light source 410, an optics assembly 420, an optical receiver 430, and processing circuitry 440.

The light source 410 may be embodied in a number of different ways. For example, according to some example embodiments, the light source 410 may be a celestial body (e.g., a star) that emits or reflects light into system 400 as the input beam 412. According to some example embodiments, the light source 410 may be a laser configured to output coherent light (e.g., spatially coherent or temporally coherent) to the system 400 as the input beam 412. The laser may include, for example, a laser diode driver configured to generate photons via a P-material and N-material junction. Further, the light source 410, for example, embodied as a laser, may include a thermoelectric cooler (TEC) driver configured to control a temperature of the light source 410 and thus characteristics of the input beam 412 during operation.

The input beam 412 generated by the light source 410 may be received by the optics assembly 420. The optics assembly 420 may be configured to receive the input beam 412 and, based on the input beam 412, generate a reference beam and the object beam represented by the object/reference output 422 output from the optics assembly 420. In this regard, the optics assembly 420 may be comprised of a collection of devices, such as polarizers, modulators, mirrors, splitters, and the like that together are configured to perform the functionalities of the optics assembly 420 as described herein.

Figure 5:
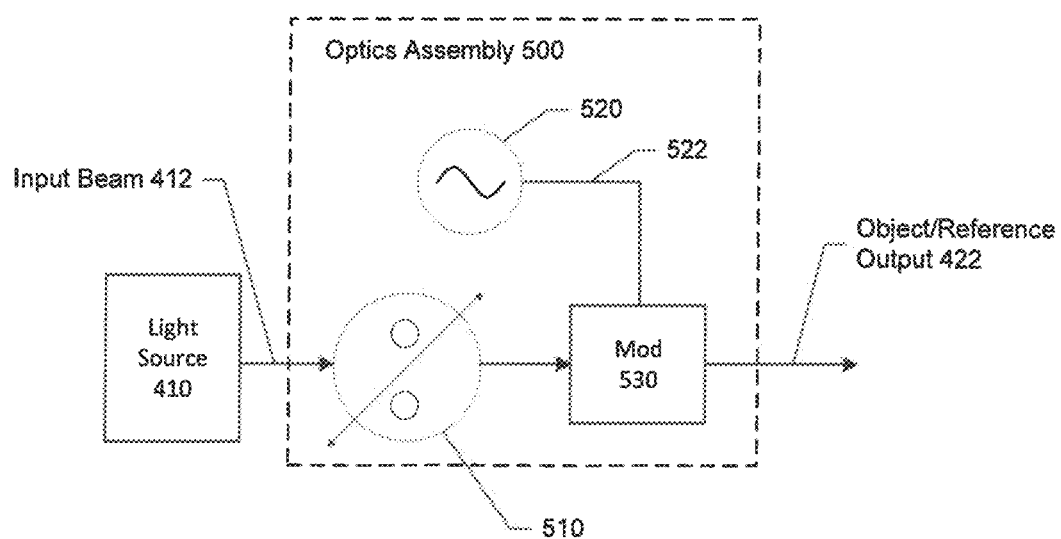
FIG. 5 is a block diagram of a light source and an optics assembly according to some example embodiments.

In this regard, referring to FIG. 5, an example embodiment of an optics assembly 420 is shown as optics assembly 500 with the light source 410 providing the input beam 412. The optics assembly 500 may be configured to function in the same or similar manner as described with respect to the optics assembly 420. In this regard, the optics assembly 500 may include a polarization maintaining fiber 510, modulator 530, and a local oscillator 520. The polarization maintaining fiber 510 may be a device that operates to receive the input beam 412 and preserve two polarizations of light in the form of, for example, a first beam and a second beam with a relative polarization angle between the beams. In this regard, the polarization maintaining fiber 510 may be configured to split the input beam 412 between polarization eigen-axes. Further, according to some example embodiments, one of the beams output from the polarization maintaining fiber 510 may be polarized parallel to a slow axis of the polarization maintaining fiber (where "slow" indicates that the light travels a relatively longer path) and the other beam may be polarized parallel to a fast axis of the polarization maintaining fiber (where "fast" indicates that the light travels a relatively shorter path). According to some example embodiments, the polarizing maintaining fiber 510 may generate two differently polarized beams, and the beams may propagate together to the modulator 530.

The modulator 530 may be configured to further differentiate the two beams received from the polarization maintaining fiber 510. In this regard, various techniques may be employed to impart further differentiation between the beams. For example, the modulator 530 may be embodied and operate as a phase modulator (e.g., a lithium niobate phase modulator) to cause one of the beams to be phase shifted relative to the other beam. With respect to a lithium niobate phase modulator, because the second-order electro-optical nonlinearity is anisotropic, one beam (e.g., a transverse electric (TE) beam) may be shifted proportionately more than a second beam (e.g., a transverse magnetic (TM) beam) for a given applied voltage. In this regard, for example, the TE beam may be shifted proportionately more because the strength of the electro-optic effect in the crystal of the phase modulator can depend on the polarization of the light field relative to the crystallographic axes of the lithium niobate. As such, for a given applied voltage, light inhabiting the TE eigenstate of the lithium niobate waveguide can experience a different phase shift as compared to light in the TM eigenstate. Further, according to some example embodiments, the amount or degree of phase shift may be a function of an input, electrical local oscillator signal 522 (e.g., a sinusoid input, a serrodyne input, or the like), provided by the local oscillator 520, which may apply the given voltage to the modulator 530 in the form of a dynamic signal to control the amount or degree of phase shift between the object and reference beams.

Alternatively to applying a phase shift between the beams, the modulator 530 may be configured as an acousto-optic frequency shifter, to impart a frequency shift such that the reference and object beams have different frequencies via control of the local oscillator 520 to facilitate optical heterodyne detection at the optical receiver 430 as further described below. Alternatively, according to some example embodiments, the frequency of the input beam 412 may be modulated, for example, at the light source 410 to facilitate differentiation between the object and reference beams. For such an example embodiment, the frequency of the input beam 412 may be modulated by varying the current flowing through, for example, a laser diode driver acting as the light source 410.

According to some example embodiments, the modulator 530 may comprise a phase shifter implemented in a chip-based system, such as a silicon or silicon dioxide photonic chip. According to some example embodiments, such a chip-based phase shifter may comprise a modulator where an optical phase may be changed by injecting a plasma of free carriers into a silicon waveguide. Alternatively, according to some example embodiments, a modulator 530 embodied as a chip-based phase shifter may comprise a modulator where the optical phase may be changed by changing the local temperature of the waveguide using an adjacent or nearby heating device, such as a resistive heater.

Regardless of the techniques employed, the optics assembly 500 may output light conditioned by the optics assembly 500 in the form of an object/reference output 422, which may comprise a reference beam and an object beam for delivery to the optical receiver 430. The object/reference output 422 may comprise the two beams with each having a different polarization. Additionally or alternatively, the beams of the object/reference output 422 may also have a phase difference due to a phase shift imparted by the modulator 530. Additionally or alternatively, the beams of the object/reference output 422 may have different frequencies due to a frequency shift applied to one or both of the beams.

Referring back to FIG. 4, the object/reference output 422 may be provided to the optical receiver 430. In this regard, the optical receiver 430 may receive the object/reference output 422 and be configured to spilt the object/reference output 422 into a reference beam and an object beam to propagate along differing paths. The reference beam may remain internal to the optical receiver 430 (and as such is not shown in FIG. 4), but the object beam may be output from the optical receiver 430 as object beam 432. The object beam 432 may be directed to interact with an object 433 (e.g., a scattering medium) to generate a scattered output 434 either as a reflected output where the output is a reflection from the object 433 or as a transmission output where the output is received as light that passes through the object 433 (as represented in FIG. 4). Regardless of whether a reflection or transmission configuration is implemented, the scattered output 434 may be received as a speckle pattern on the photoreceiver array 436 of the optical receiver 430, where the photoreceiver array 436 includes M photoreceivers. As further described below, each of the photoreceivers in the photoreceiver array 436 may be associated with a corresponding channel or electrical output such that respective electrical detection signals 438 are output to the processing circuitry 440 for processing as further described below.

Figure 6:
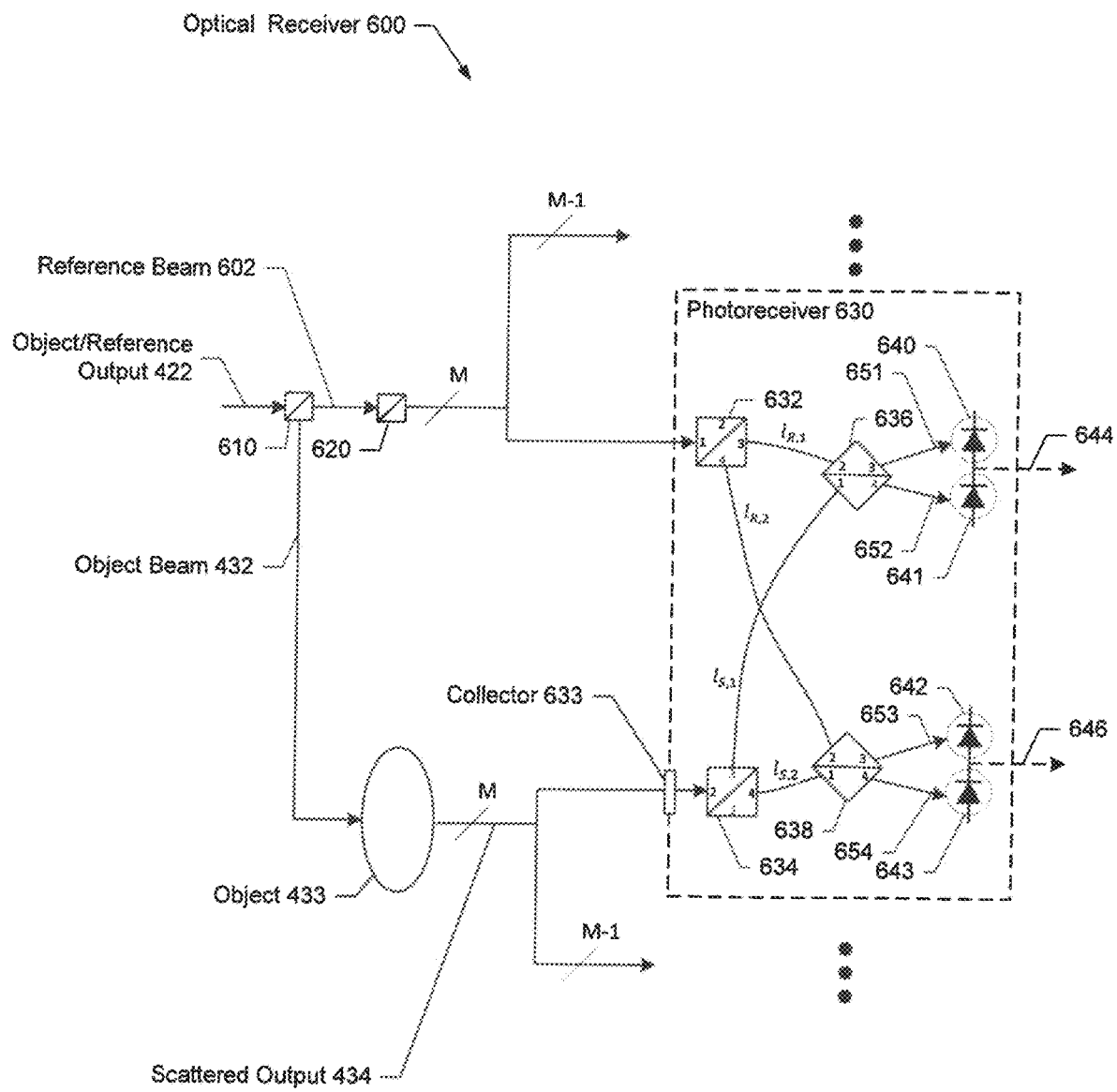
FIG. 6 is a schematic diagram of an optical receiver according to some example embodiments.

FIG. 6 shows an example embodiment of an optical receiver 430 as optical receiver 600 that receives the object/reference output 422. The optical receiver 600 may be configured to function in the same or similar manner as described with respect to the optical receiver 430. The optical receiver 600 may comprise an array of photoreceivers where each photoreceiver receives a portion of a speckle pattern as further described herein. As indicated above, the array of photoreceivers may include M individual photoreceivers. While FIG. 6 shows a single photoreceiver 630 for ease of explanation, it is understood that the single photoreceiver 630 is one of M photoreceivers of the array that are each positioned differently, but otherwise identical in construction and configuration.

As such, the optical receiver 600 may comprise splitters 610 and 620, and an array of photoreceivers including photoreceiver 630. The optical receiver 600 may be configured to receive the object/reference output 422 as an input to the optical receiver 600 at a splitter 610. Splitter 610 may be a polarizing beam splitter configured to separate the reference beam 602 from the object beam 432. As such, the splitter 610 may direct light of the object/reference output 422 of a first polarization in a first direction as the reference beam 602 and direct light of the object/reference output 422 of a second polarization (different from the first polarization) in a second direction as the object beam 432.

The reference beam 602 may be split again at splitter 620, which may be a polarization maintaining splitter. In this regard, as a polarization maintaining splitter, the splitter 620 may form a plurality of beams with the same polarization as the input light. Accordingly, the splitter 620 may split the reference beam 602 into M instances (or M channels) of the reference beam for delivery to and receipt by each of the M photoreceivers for use in mixing within each photoreceiver. Each instance of the reference beam 602 may be delivered to the respective photoreceivers via a fiber bundle composed of, for example, polarization-maintaining fibers, where each fiber is directed to a respective photoreceiver. As shown in FIG. 6, one of the M instances of the reference beam 602 is provided to the photoreceiver 630 for use in mixing as further described below.

The splitter 610 also splits off the object beam 432 from the object/reference output 422, and the object beam 432 is directed to interact with the object 433 in either a reflective or transmission configuration. In this regard, FIG. 6 illustrates an example transmission configuration. As such, the object beam 432 is directed, for example, via optics including mirrors and the like, to interact with the object 433 such that a scattered output 434 is created. According to some example embodiments, because a state of polarization of the object beam 432 may be uncontrolled as the object beam 432 interacts with the object 433, the scattered output 434 may therefore have an unknown state of polarization. The scattered output 434 may then be received on, for example, a planar surface of the optical receiver 600 that includes collectors of the array of photoreceivers including the photoreceiver 630. As such, each photoreceiver including the photoreceiver 630 may receive a portion of the scattered output 434 as a portion of a speckle pattern formed by the scattered output 434.

The photoreceiver 630 may comprise splitters 632, 634, 636, and 638, as well as photodiodes 640, 641, 642, and 643, and a collector 633. The splitter 632 may be a polarization maintaining beam splitter that receives one of the M instances of the reference beam 602 and forms two additional instances of the reference beam for delivery to splitters 636 and 638 for mixing. In this regard, as shown in FIG. 6 and relied upon in more detail below, the splitter 632 may include two input ports (i.e., port 1 and port 2), where one of the input ports is unused (i.e., port 2), and two output ports (i.e., port 3 and port 4).

The collector 633 may be an optical interface for receiving a portion of the speckle pattern generated by the object beam 432's interaction with the object 433. According to some example embodiments, the collector 633 may be an end of an optical fiber (e.g., a cleaved end) or a photonic waveguide that is configured to receive the respective portion of the speckle pattern and deliver the associated light to the splitter 634. The splitter 634 may operate to split the light associated with the respective portion of the speckle pattern for delivery to splitters 636 and 638 for mixing. As shown in FIG. 6 and relied upon in more detail below, the splitter 634 may include two input ports (i.e., port 1 and port 2), where one of the input ports is unused (i.e., port 1), and two output ports (i.e., port 3 and port 4). The splitter 634 may be a polarizing beam splitter, which may handle the unknown state of polarization of the scattered output 434. The polarizing beam splitter 634 may, for example, transmit a horizontally polarized component of the scattered output 434 to a first output port and reflect a vertically polarized component of the scattered output 434 to a second output port. In this way, the splitter 634 introduces polarization into the signals provided to the splitters 636 and 638 relative to the signal provided to splitter 634 which, according to some example embodiments, may operate to reduce or minimize polarization fading via polarization diversity detection.

Splitters 636 and 638 may each be four port devices with two input ports and two output ports and may operate as polarization maintaining splitters. The splitters 636 and 638 may be configured to operate as mixers to mix or otherwise combine the signals provided at the input ports. The splitters 636 and 638 may output a signal (or field) on each of the output ports that is based on a transmission matrix for the splitter as further described below. According to some example embodiments, the splitters 636 and 638 may be the same component implemented in two separate instances as described below.

In general, the splitter 636 may receive a split portion of the speckle pattern received at the collector 633 on a first input port (port 1) and a reference beam from splitter 632 on a second input port (port 2). The splitter 636 may provide optical signal 651 from a first output port (port 3) and an optical signal 652 from a second output port (port 4). The splitter 638 may receive a split portion of the speckle pattern received at the collector 633 on a first input port (port 1) and a reference beam on a second input port (port 2) from splitter 632. The splitter 638 may provide an optical signal 653 from a first output port (port 3) and an optical signal 654 from a second output port (port 4). The proportion of the light directed to port 1 of splitter 636 as compared to that directed to port 1 of splitter 638 may be determined by the instantaneous state of polarization of the scattered output 434 arriving at the polarization beam splitter 634.

In general, the optical connections between splitter 632, splitter 634, splitter 636, splitter 638, photodiode 640, photodiode 641, photodiode 642, photodiode 643, and collector 633 may be formed by polarization-maintaining waveguides. These waveguides may be arranged in such a way that a split portion of the speckle pattern received on a first input port (port 1) and a reference beam on a second input port (port 2) of the splitter 636 share a common state of polarization. Similarly, these waveguides may be arranged in such a way that a split portion of the speckle pattern received on a first input port (port 1) and a reference beam on a second input port (port 2) of the splitter 638 share a common state of polarization. As such, the waveguides may be the medium by which optical signals propagate from the collector 633 and the splitter 620 to the photodiodes 640, 641, 642, and 643. According to some example embodiments, the waveguides may comprise optical fibers. According to some example embodiments, these waveguides may be integrated into a chip. In some example embodiments, the waveguides may be single-mode waveguides. Such single-mode waveguides may operate to, for example, reduce or eliminate deleterious multi-mode effects when mixing the object beam with the reference beam as described herein.

The photodiodes 640, 641, 642, and 643 may be configured to receive outputs from the splitters 636 and 638. Photodiode 640 may be coupled (e.g., connected in electrical series) with photodiode 641 to form a first detector, and photodiode 642 may be coupled (e.g., connected in electrical series) with photodiode 643 to form a second detector. Note that other electrical components connected to photodiodes 640, 641, 642, and 643 are not shown, but would be understood for implementation as described herein by one of ordinary skill in the art. According to some example embodiments, the first detector, comprising photodiodes 640 and 641, and the second detector, comprising photodiodes 642 and 643, may be configured to operate as balanced detectors. Such balanced detectors may operate to improve the SNR in the received signals by suppressing, for example, common-mode noise such as residual intensity noise of the light source 410 and the input beam 412. According to some example embodiments, because photodiode 640 is connected in series with photodiode 641, the respective output currents cancel each other when the currents are equal and thus the received light signals (e.g., optical signals 651 and 652) are equal. Accordingly, the balanced detector comprising the photodiode 640 and photodiode 641 may operate to determine and output a difference between the photocurrents generated by the photodiodes. As such, based on the configuration of the photoreceiver 630, the first detector comprising the photodiode 640 and 641 may output an electrical detection signal 644 that represents information from a component of the scattered output 434 having a first polarization (e.g., the vertically polarized component of the scattered output 434).

Similarly, according to some example embodiments, because photodiode 642 is connected in series with photodiode 643, the respective output currents cancel each other when the currents are equal and thus the received light signals (e.g., optical signals 653 and 654) are equal. Accordingly, the second balanced detector comprising the photodiode 642 and photodiode 643 may operate to determine and output a difference between the photocurrents generated by the photodiodes. As such, based on the configuration of the photoreceiver 630, the second detector comprising the photodiode 642 and 643 may output an electrical detection signal 646 that represents information from a component of scattered output 434 having a second polarization (e.g., the horizontally polarized component of the scattered output 434). In this regard, the first polarization referenced above and associated with electrical detection signal 644 may be perpendicular to the second polarization associated with the electrical detection signal 646 to facilitate polarization diversity.

Figure 7:
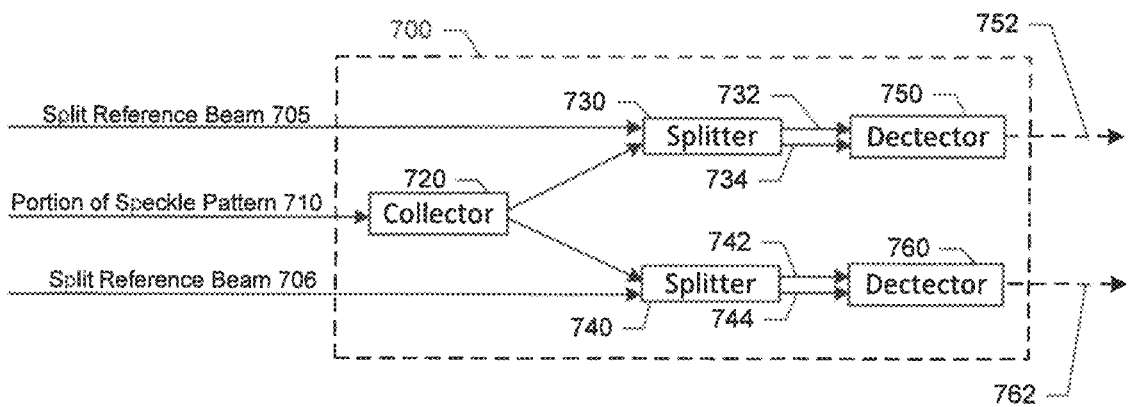
FIG. 7 is a block diagram of a photoreceiver according to some example embodiments.

Another example embodiment of a photoreceiver that may be a component of the optical receiver 430 is provided as photoreceiver 700 of FIG. 7. In this regard, the photoreceiver 700 is shown as a more general block diagram and may operate in the same or similar manner as the photoreceiver 630. In this regard, according to some example embodiments, the photoreceiver 700 may be implemented as a single photoreceiver within an array of photoreceivers as described herein. The photoreceiver 700 may comprise a collector 720, a first splitter 730, a second splitter 740, a first detector 750, and a second detector 760.

The collector 720 may be configured to receive a portion of a scattered output that results from interaction of an object beam (e.g., object beam 432) with an object (e.g., object 433) as a portion of a speckle pattern 710. According to some example embodiments, the collector 720 may be an interface for receiving an optical signal into the photoreceiver 700 and may be embodied by, for example, a photonic waveguide or an optical fiber with, for example, a cleaved end. According to some example embodiments, when the photoreceiver 700 is coupled with other photoreceivers within an array, the collector 720 may be one of a plurality of fibers within a fiber bundle where, for example, each fiber within the bundle is a respective collector of a photoreceiver.

The photoreceiver 700 may also receive or generate split reference beams 705 and 706. In this regard, according to some example embodiments, the photoreceiver 700 may include a splitter (e.g., splitter 632) that is configured to split reference beams for delivery to the splitters 730 and 740. Additionally, the collector 720 may include or be coupled to a splitter (e.g., splitter 634) that is configured to split the portion of the speckle pattern 710 received by the collector 720 for provision to the splitters 730 and 740.

The splitters 730 and 740 may be the same or similar to the splitters 636 and 638 described above. In this regard, the splitters 730 and 740 may include two input ports and two output ports and may generate the outputs in accordance with a characteristic transmission matrix for the splitters. The outputs of first splitter 730 may be provided as optical signals 732 and 734 (which may be same or similar to the optical signals 651 and 652) to a first detector 750. The outputs of the second splitter 740 may be provided as optical signals 742 and 744 (which may be same or similar to the optical signals 653 and 654) to a second detector 760. The detectors 750 and 760 may each comprise a series of photodiodes to form balanced detectors, such as the configuration of photodiodes 640, 641, 642, and 643 described above. As such, according to some example embodiments, the first detector 750 may be configured to output an electrical detection signal 752 and the second detector 760 may be configured to output an electrical detection signal 762, where the electrical detection signal 752 and the electrical detection signal 762 are output as electrical detection signals 438, as shown in FIG. 4. In this regard, due to the polarization introduced by splitters 730 and 740, the electrical detection signal 752 may include information from a component of the portion of the speckle pattern 710 having a first polarization (e.g., the vertically polarized component of the portion of the speckle pattern 710). Similarly, due to the polarization introduced by splitters 730 and 740, the electrical detection signal 762 may include information from a component of the portion of the speckle pattern 710 having a second polarization (e.g., the horizontally polarized component of the portion of the speckle pattern 710), where the first polarization is perpendicular to the second polarization.

Referring back to FIG. 4, the optical receiver 430 and, more particularly, the photoreceivers of the optical receiver 430, may be configured to output electrical detection signals 438 for provision to processing circuitry 440. As described above, the electrical detection signals 438 may comprise, for example, in-phase and quadrature electrical signals for each photoreceiver in the photoreceiver array 436.

The processing circuitry 440 may be configured to receive the electrical detection signals 438 to perform signal processing on the electrical detection signals 438 as described herein to generate amplitude and phase information regarding the object 433 as a scattering medium. The processing circuitry 440 may be configurable to perform operations in accordance with example embodiments described herein. According to some example embodiments, the processing circuitry 440 may be configured to perform signal processing embodied as a chip or chip set or a component of a chip (e.g., a chip that also comprises optical receiver 430). In other words, the processing circuitry 440 may comprise one or more physical packages (e.g., chips) including materials, components and/or wires on a structural assembly (e.g., a baseboard). In an example embodiment, the processing circuitry 440 may include one or more instances of a processor and a memory device. As such, the processing circuitry 440 may be embodied as one or more instances of a circuit chip (e.g., an integrated circuit chip) configured (e.g., with hardware, software or a combination of hardware and software) to perform operations described herein.

In some example embodiments, a memory of the processing circuitry 440 may include one or more non-transitory memory devices such as, for example, volatile and/or non-volatile memory that may be either fixed or removable. The memory may be configured to store information, data, applications, instructions or the like for enabling the processing circuitry 440 to perform, for example, signal processing to carry out various functions in accordance with example embodiments. For example, the memory could be configured to buffer input data for processing by a processor. Additionally or alternatively, the memory may be configured to store instructions for execution by the processor.

A processor of the processing circuitry 440 may be embodied in a number of different ways. For example, the processor may be embodied as various processing means such as one or more of a microprocessor or other processing elements, a coprocessor, a controller, or various other computing or processing devices including integrated circuits such as, for example, an ASIC (application specific integrated circuit), an FPGA (field programmable gate array), or the like. In an example embodiment, the processor may be configured to execute instructions stored in the memory or otherwise accessible to the processor. As such, whether configured by hardware or by a combination of hardware and software, the processor may represent an entity (e.g., physically embodied in circuitry—in the form of processing circuitry 440) capable of performing operations according to the example embodiments described herein while configured accordingly. Thus, for example, when the processor is embodied as or is a component of an ASIC, FPGA or the like, the processor may be specifically configured hardware for conducting the operations described herein. Alternatively, as another example, when the processor is embodied as an executor of software instructions, the instructions may specifically configure the processor to perform processing operations as described herein.

More specifically, the processing circuitry 440 (e.g., via the processor) may be configured to receive the electrical detection signals 438 from each of the photoreceivers of the photoreceiver array 436 and perform a summing operation on the electrical detection signals 438. Via the summing operation, the processing circuitry 440 may generate an output indicating amplitude and phase information that is a representation of the effect that the object 433 had on the object beam 432 with an improved SNR, for example, relative to a representation that could be generated using a single conventional optical sensor. According to some example embodiments, the operation may be performed upon each of the signals received from the respective photoreceivers of the photoreceiver array 436 after first demodulating the signals. Demodulation may include, for example, the use of digital lock-in detection at the modulation frequency (e.g., modulation frequency of local oscillator 520) to compute the baseband quadrature and in-phase components of the signals. A time-varying amplitude may then be computed by evaluating, for example, the square root of the sum of the squares of the quadrature and in-phase components. The time-varying phase may also be evaluated by computing the arctangent of the ratio of the in-phase component to the quadrature component. Once computed, the time-varying amplitude and the time-varying phase may represent the potentially time-varying amplitude and phase for a speckle lobe associated with the respective portion of the speckle pattern received by the particular photoreceiver. The time dependence of these amplitudes and phases may be a direct measure of dynamical activity occurring in the object 433 as a scattering medium. As such, a summing operation may be performed with respect to the determined amplitude and phase for each photoreceiver. Further, the summing operation may be performed by coherently summing the respective amplitudes and phases associated with the respective speckle lobes across each of the photoreceivers.

The result of the summing operation may generate the output signal comprising amplitude and phase information for further application-based analysis. Such application-based analysis may include, where the object 433 is biological tissue such as brain tissue, detecting changes in the object 433 with respect to time to thereby detect, for example, brain activity. As such, the application-based analysis may be performed by the processing circuitry 440 to determine characteristics of the object 433 or detect changes in the object 433 over time.

Having described the configuration and operation of the system 400, and more specifically, the optical receiver 430 and the processing circuitry 440, in general terms, the following provides a more detailed description of the theoretical aspects that may be utilized to operate the system 400, with reference to the components of photoreceiver 630 where applicable. In this regard, the radiant energy of the scattered output 434 based on the object beam 432 interacting with the object 433, referred to here as the signal field, received at collector 633 may be represented as $\text{Re}[(a_{s,h}\hat{h} + a_{s,v}\hat{v})e^{-i\varphi_s(t)}e^{-i\omega t}]$, where: $a_{s,h}$ is the amplitude of the component of the signal field polarized parallel to a horizontal axis of polarization beam splitter 634; $\hat{h}$ is a unit vector parallel to the horizontal axis of polarization beam splitter 634; $a_{s,v}$ is the amplitude of the component of the signal field polarized parallel to a vertical axis of the polarization beam splitter 634; $\hat{v}$ is a unit vector parallel to the vertical axis of the polarization beam splitter 634; $\varphi_s$ is the time-varying phase of the signal field; $\omega$ is the optical angular frequency; and t represents time. Similarly, the reference beam 602, referred to here as the reference field, may be represented as $\text{Re}[a_R e^{-i\varphi_R(t)}e^{-i\omega t}]$, where $a_R$ is the amplitude of the reference field, $\varphi_R$ is the time-varying phase of the reference field, $\omega$ is the optical angular frequency, and t represents time. By construction, the polarization of the reference field may be aligned to be parallel to the polarization eigen-axis of polarization maintaining splitter 632, and the reference field may therefore be treated as a scalar quantity. In this notation, the amplitude may be complex $a_K = m_K e^{i\delta_K}$, where $m_K$ represents the magnitude, $\delta_K$ is the phase offset, and $K \in (s, v; s, h; R)$. Additionally, as indicated in these representations, the time-varying relative phase between the signal field and the reference field may include contributions from the modulator 530 when operating as a phase modulator. In this regard, according to some example embodiments, the phase of the reference field may be shifted proportionately more than the phase of the signal field for a given voltage applied to the phase modulator. Additionally, the time-varying relative phase between the signal field and the reference field may also include contributions from parasitic path length changes in the optical fibers delivering the fields. Such parasitic effects may occur elsewhere in the system where the object beam and the reference beam do not traverse a common path. Also, the time-varying relative phase between the signal field and the reference field also includes contributions from speckle movement or "boiling" that can be caused by characteristics of the object 433, particularly when the object 433 is active brain tissue.

The splitting operation of the polarization maintaining splitter 632 may be defined by a transmission matrix. For example, the transmission matrix may be:

$$\frac{1}{\sqrt{2}}\begin{bmatrix} 1 & i \\ i & 1 \end{bmatrix}$$

where $i \equiv \sqrt{-1}$. Applying this transmission matrix to the reference field, then the field at output port 3 of splitter 632 is $$\frac{1}{\sqrt{2}} a_R e^{-i\varphi_R(t)} e^{-i\omega t}$$

while the field at output port 4 of splitter 632 is $$\frac{i}{\sqrt{2}} a_R e^{-i\varphi_R(t)} e^{-i\omega t}.$$

The polarization beam splitter 634 may operate by transmitting (e.g., completely transmitting) the horizontally polarized component of the signal field arriving at the input port coupled to the collector 633 (i.e., port 2) to an output port coupled to the splitter 638 (i.e., port 4). On the other hand, the polarization beam splitter 634 may also operate to reflect (e.g., completely reflect) the vertically polarized component of the signal field arriving at the input port coupled to the collector 633 (i.e., port 2) to an output port coupled to the splitter 636 (i.e., port 3). The field at output port of splitter 634 that is coupled to splitter 636 (i.e., part 3) then becomes $a_{s,v} e^{-i\varphi_s(t)} e^{-i\omega t}$, while the field at output port of splitter 634 coupled to splitter 638 (i.e., port 4) then becomes $a_{s,h} e^{-i\varphi_s(t)} e^{-i\omega t}$. The fields emitted by output ports of splitter 632 (i.e., ports 3 and 4) propagate in the slow-axis of single-mode polarization-maintaining waveguides of lengths $l_{R,1}$ and $l_{R,2}$, respectively, to an input port of splitter 636 (i.e., port 2) and an input port of splitter 638 (i.e., port 2). The fields emitted by output ports of splitter 634 (i.e., ports 3 and 4) propagate in the slow axis of single-mode polarization-maintaining waveguides of lengths $l_{S,1}$ and $l_{S,2}$, respectively, to an input port of splitter 636 (i.e., port 1) and an input port of splitter 638 (i.e., port 1). After accumulating phase due to propagation, the fields at the input ports of splitters 636 and 638 are:

a) Splitter 636, port 1: $a_{s,v} e^{-i\varphi_s(t)} e^{-i\omega t} e^{i\beta l_{S,1}}$
b) Splitter 636, port 2: $a_R e^{-i\varphi_R(t)} e^{-i\omega t} e^{i\beta l_{R,1}}$
c) Splitter 638, port 1: $a_{s,h} e^{-i\varphi_s(t)} e^{-i\omega t} e^{i\beta l_{S,2}}$
d) Splitter 638, port 2: $a_R e^{-i\varphi_R(t)} e^{-i\omega t} e^{i\beta l_{R,2}}$ where β represents an effective propagation constant of the slow axis of the single-mode polarization-maintaining fibers, and a factor of $1/\sqrt{2}$ has been absorbed into the definition of the complex reference amplitude $a_R$.

As mentioned above, the mixing that is performed by the splitters 636 and 638 may be defined by a transmission matrix. For example, the transmission matrix may be:

$$\frac{1}{\sqrt{2}}\begin{bmatrix} 1 & i \\ i & 1 \end{bmatrix},$$

where $i \equiv \sqrt{-1}$. As such, for splitter 636, the output fields, as optical signal 651 (from port 3) and optical signal 652 (from port 4) may be represented by the following. For the optical signal 651, the output complex electric field may be defined as:

$$E_{651} = \frac{e^{-i\omega t}}{\sqrt{2}} (ia_{s,v} e^{-i\varphi_s(t)} e^{i\beta l_{S,1}} + a_R e^{-i\varphi_R(t)} e^{i\beta l_{R,1}}).$$

For the optical signal 652, the output field may be defined as:

$$E_{652} = \frac{e^{-i\omega t}}{\sqrt{2}} (a_{s,v} e^{-i\varphi_s(t)} e^{i\beta l_{S,1}} + ia_R e^{-i\varphi_R(t)} e^{i\beta l_{R,1}}).$$

Accordingly, the output photocurrents from the photodiodes 640 and 641 may be described in terms of $1_K \equiv \eta E_K^* E_K$ where $I_K$ is the photocurrent generated by the $K^{th}$ photodiode, η represents a responsivity of the photodiodes 640 and 641 operating as a balanced detector, and $E_K$ is the complex electric field arriving at the photodiode. According to some example embodiments, the responsivity of all four photodiodes 640, 641, 642 and 643 may be assumed to be the same. Accordingly, the output photocurrent for photodiode 640, $I_{640}$, may be:

$$I_{640} = \frac{\eta}{2}(m_{s,v}^2 + m_R^2 + ia_{s,v} a_R^* e^{-i(\varphi_s(t) - \varphi_R(t))} e^{i\beta(l_{S,1} - l_{R,1})} + ia_{s,v}^* a_R e^{i(\varphi_s(t) - \varphi_R(t))} e^{-i\beta(l_{S,1} - l_{R,1})})$$

where η is the responsivity of the photodiode, $m_{s,v}$ is the scalar magnitude of the signal arriving at the photodiode, $m_R$ is the scalar magnitude of the reference arriving at the photodiode, $a_{s,v} \equiv m_{s,v} e^{i\delta_{s,v}}$ is the complex amplitude of the signal arriving at the photodiode, $a_R \equiv m_R e^{i\delta_R}$ is the complex amplitude of the reference arriving at the photodiode, $\varphi_S$ is the phase of the signal arriving at the photodiode, and $\varphi_R$ is the phase of the reference arriving at the photodiode.

Likewise, the output photocurrent for the photodiode 641, $I_{641}$, may be written as:

$$I_{641} = \frac{\eta}{2}(m_{s,v}^2 + m_R^2 - ia_{s,v} a_R^* e^{-i(\varphi_s(t) - \varphi_R(t))} e^{i\beta(l_{S,1} - l_{R,1})} + ia_{s,v}^* a_R e^{i(\varphi_s(t) - \varphi_R(t))} e^{-i\beta(l_{S,1} - l_{R,1})})$$

where the same symbolic definitions apply. Accordingly, the output of the balanced detector formed by the photodiodes 640 and 641 (i.e., the electric detection signal 644) may be represented as $I_{640} - I_{641}$ or:

$$I_{640} - I_{641} = \eta(a_{s,v} a_R^* e^{-i(\varphi_s(t) - \varphi_R(t))} e^{i\beta(l_{S,1} - l_{R,1})} e^{i\pi/2} + a_{s,v}^* a_R e^{i(\varphi_s(t) - \varphi_R(t))} e^{-i\beta(l_{S,1} - l_{R,1})} e^{-i\pi/2}).$$

Without a loss of generality, the phase angles of the preceding expression, according to some example embodiments, may be folded into a single time-dependent phase, θ(t), with the following substitution of variables:

$$\varphi_S(t) - \varphi_R(t) - \delta_{s,v} + \delta_R - \beta(l_{S,1} - l_{R,1}) - \frac{\pi}{2} \rightarrow -\theta(t)$$

where, again, $\varphi_S(t)$ is the phase of the signal arriving at the balanced detector, $\varphi_R(t)$ is the phase of the reference arriving at the balanced detector, and $\delta_{s,v}$ and $\delta_R$ are the phase offsets of the signal and reference, respectively. As a result, the difference current $I_{640}-I_{641}$ may become more compact and can be represented as:

$$\Delta I_{644} = I_{640} - I_{641} = 2\eta \cdot m_R m_{s,v} \cos \theta(t).$$

As can be seen, the difference current may be directly proportional to the magnitude of the reference field, the magnitude of the vertically polarized component of the signal field, and the relative phase between the fields.

The output of the balanced detector formed by photodiodes 642 and 643 (i.e., the electric detection signal 646) is similar in form, and is now derived for completeness. For the optical signal 653, the complex electric field may be defined as:

$$E_{653} = \frac{e^{-i\omega t}}{\sqrt{2}} \left( a_{s,h} e^{-i\varphi_S(t)} e^{i\beta l_{S,2}} - a_R e^{-i\varphi_R(t)} e^{i\beta l_{R,2}} \right).$$

Likewise, for the optical signal 654, the complex electric field may be defined as:

$$E_{654} = \frac{e^{-i\omega t}}{\sqrt{2}} \left( i a_{s,h} e^{-i\varphi_S(t)} e^{i\beta l_{S,2}} + i a_R e^{-i\varphi_R(t)} e^{i\beta l_{R,2}} \right).$$

Accordingly, the output of the balanced detector formed by the photodiodes 642 and 643 (i.e., the electric detection signal 646) may be represented as $I_{642}-I_{643}=\eta(E_{653}*E_{653}-E_{654}*E_{654})$, or:

$$I_{642}-I_{643}=-\eta(a_{s,h}a_R*e^{-(\varphi_S(t)-\varphi_R(t))}e^{i\beta(l_{S,2}-l_{R,2})}+a_{s,h}*a_R e^{i(\varphi_S(t)-\varphi_R(t))}e^{-i\beta(l_{S,2}-l_{R,2})}).$$

Again, without a loss of generality, the phase angles of the preceding expression, according to some example embodiments, may be folded into a single time-dependent phase, ψ(t), with the following substitution of variables:

$$\varphi_S(t) - \varphi_R(t) - \delta_{s,h} + \delta_R - \beta(l_{S,2}-l_{R,2}) \rightarrow -\psi(t)$$

where, again, $\varphi_S(t)$ is the phase of the signal arriving at the balanced detector, $\varphi_R(t)$ is the phase of the reference arriving at the balanced detector, and $\delta_{s,h}$ and $\delta_R$ are the phase offsets of the signal and reference, respectively. As a result, the difference current $I_{642}-I_{643}$ may become more compact and can be represented as:

$$\Delta I_{646} = I_{642} - I_{643} = -2\eta \cdot m_R m_{s,h} \cos \psi(t).$$

As can be seen, the difference current may be directly proportional to the magnitude of the reference field, the magnitude of the horizontally polarized component of the signal field, and the relative phase between reference field and the signal field.

To interpret the difference currents $\Delta I_{644}$ and $\Delta I_{646}$, (i.e., the electric detection signals 644 and 646), the currents may be re-written as being proportional to harmonic components:

$$\Delta I_{644} \propto (e^{i\theta(t)} + e^{-i\theta(t)}) \text{ and } \Delta I_{646} \propto (e^{i\psi(t)} + e^{-i\psi(t)})$$

or $$\Delta I \propto (e^{i\theta(t)} + e^{-i\theta(t)})$$

where again, the phase θ(t) or ψ(t) represents all possible contributions to the phase difference between the signal field and reference field, which in turn may cause variations in the electric detection signals 644 and 646, respectively.

Additionally, information can be deduced about the amplitude and/or phase of a signal of interest in consideration of the particular modulation/demodulation scheme that is used. In this regard, the mathematical treatment may be identical regardless of the consideration of the previously defined phases θ(t) or ψ(t). Without loss of generality, the sinusoidal modulation imparted by the phase modulator from other contributions to the phase difference may be explicitly separated. In other words, the following substitutions of variables may be made:

$$\theta(t) \rightarrow m \sin \Omega t + \phi$$

and $$\psi(t) \rightarrow m \sin \Omega t + \phi.$$

Here, m represents a modulation depth of the sinusoidal modulation imparted by a phase modulator (e.g., modulator 530) in units of radians and is the amplitude of the sinusoidal modulation imparted by the phase modulator, as controlled by the electrical local oscillator signal 522 applied to the modulator 530, when operating as a phase modulator. The radio frequency Ω may represent the frequency of the phase modulation imparted by a phase modulator, likewise controlled by the electrical local oscillator signal 522 applied to the phase modulator. The remaining quantity, ϕ, may represent other contributions to the phase such as the dynamics in the scattering medium and environmental fluctuations in the optical apparatus. As such, a representation of a signal of interest can be defined that is assumed to vary slowly relative to the imparted sinusoidal modulation.

The mathematical identity, the Jacobi-Anger expansion, is defined as:

$$e^{im\sin\Omega t} = \sum_{n=-\infty}^{\infty} J_n(m) e^{in\Omega t}$$

which is an expansion of exponential functions of trigonometric functions in a basis of their harmonics. In this expansion, $J_n$ is the $n^{th}$ Bessel function of the first kind, m continues to represent the modulation depth, Ω represents the modulation frequency, and n is an integer. Inserting the Jacobi-Anger identity to re-write the difference currents 644 and 646, the currents can be simplified to become:

$$\Delta I_{644} = 4\eta \cdot m_{s,v} m_R \{\cos \phi [\Sigma_0^\infty J_{2n}(m)\cos(2n\Omega t)] - \sin \phi [\Sigma_0^\infty J_{2n+1}(m)\sin((2n+1)\Omega t)]\}$$

and $$\Delta I_{646} = -4\eta \cdot m_{s,h} m_R \{\cos \phi [\Sigma_0^\infty J_{2n}(m)\cos(2n\Omega t)] - \sin \phi [\Sigma_0^\infty J_{2n+1}(m)\sin((2n+1)\Omega t)]\}.$$

In this formulation, it becomes clear that the difference currents 644 and 646 include components that are either in-phase or quadrature with the phase of the signal of interest, ϕ. In other words, these components are grouped in the terms that are multiplied by cos ϕ or sin ϕ, respectively.

Based on this result, it is shown that an approach involving modulation based on a sinusoidal waveform may be implemented by controlling the modulation depth m. If, for example, the modulation depth m is controlled to be approximately 2.6 radians which is the crossing point of the Bessel functions $J_1$ and $J_2$ (i.e., $J_1(2.6 \text{ rad}) \approx J_2(2.6 \text{ rad})$), then the harmonic components of the difference frequency oscillating at frequencies 1Ω and 2Ω will dominate the difference current and have approximately equal amplitudes. For signal processing, the processing circuitry 440 may then be configured to individually down-convert the 1Ω and 2Ω-components by performing element-wise multiplication of the difference current, i.e., electric detection signal 644 (or electric detection signal 646) against digital representations of sin(Ωt) and sin(2Ωt), respectively. Following down-conversion, the time-series may be low-pass filtered and directly proportional to the quadrature, Q, and in-phase, I, components of the phase of the signal-of-interest, sin ϕ and cos ϕ, respectively. For the electric detection signals 644, these quantities are defined as $I \propto m_{s,v} \sin \phi$ and $Q \propto m_{s,v} \cos \phi$. For the electric detection signals 646, these quantities are defined as $I \propto m_{s,h} \sin \phi$ and $Q \propto m_{s,h} \cos \phi$. The phase of the signal-of-interest may then be evaluated in real time by computing the four-quadrant inverse tangent:

$$\phi = \tan^{-1}\left(\frac{I}{Q}\right).$$

Likewise, a quantity proportional to the signal magnitude (either $m_{s,v}$ or $m_{s,h}$ for electric detection signals 644 or electric detection signals 646, respectively) may be computed as:

$$m_{s,v} \text{ or } m_{s,h} \propto \sqrt{I_2 + Q^2}.$$

Figure 8:
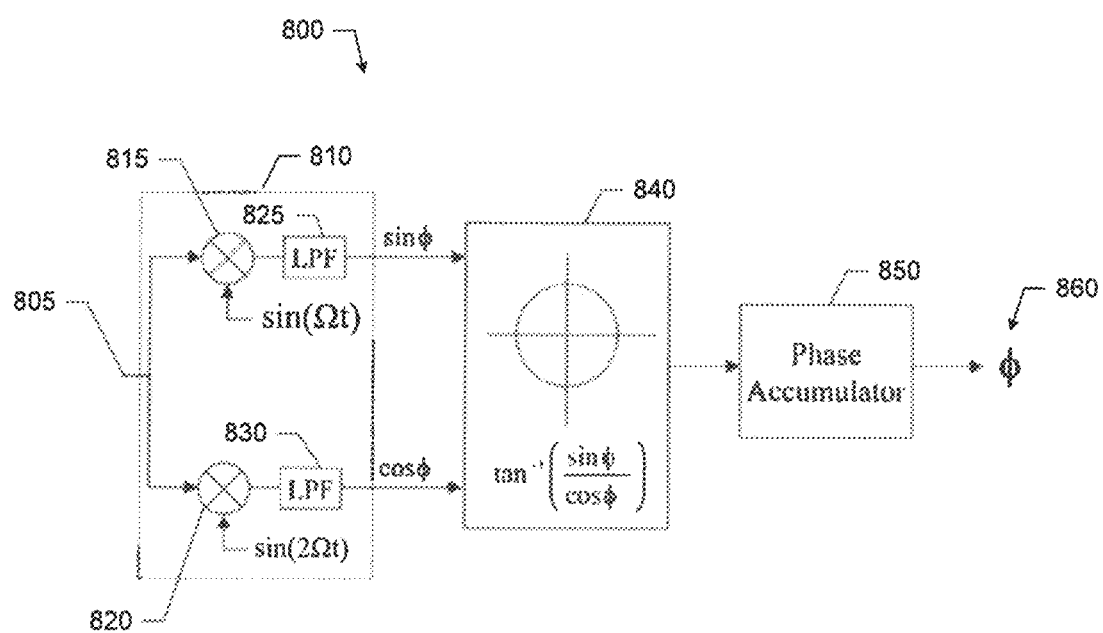
FIG. 8 is a block diagram illustrating a method for signal processing according to some example embodiments.

In this regard, FIG. 8 provides a high-level block diagram of an example signal processing method 800 for determining the phase of the signal-of-interest ϕ, which is a representation of the phase change caused by the object 433 (e.g., scattering medium) as described herein. In this regard, the example method 800 may include receiving the difference current at the input 805. At 810, the example method may include a down conversion stage where the input signal is converted to baseband. In this regard, the input signal at 805 may be split and provided to mixer 815 to be mixed with the sinusoidal input sin(Ωt) and passed through a low pass filter 825 to generate a signal representative of sin(ϕ). Similarly, the input signal at 805 may be split and provided to mixer 820 to be mixed with the sinusoidal input sin(2Ωt) and passed through a low pass filter 830 to generate a signal representative of cos(ϕ).

At 840, a coordinate transformation stage may be implemented. In this regard, an inverse tangent of the sin(ϕ) signal over the cos(ϕ) signal may be taken to determine the phase of the signal-of-interest, ϕ. This phase, as computed, is a modulo 2π quantity. As such, a phase accumulator 850 may be implemented in a fringe counting stage to unwrap the time-varying phase, ϕ, at 860 to remove the artificial modulo 2π wrapping effect. The phase information provided by the signal ϕ may be utilized further in application-based contexts to determine information regarding, for example, brain activity where the object 433 is active brain tissue.

Another option for modulation may be a serrodyne phase modulation approach, as opposed to the sinusoidal approach described above. In this regard, a modulator (e.g., modulator 530) may introduce a serrodyne phase shift into, for example, the reference field relative to the signal field. The modulator may be controlled to generate a phase difference between the reference field (e.g., reference beam 602) and the signal field (e.g., object beam 432) that changes or evolves linearly from 0 to 2π·n over a period T in a periodic fashion, where n is an integer. Using this approach to modulation, the difference currents (i.e., the electric detection signals 644 and 646) may be represented in the same form as previously defined, namely:

$$\Delta I_{644} = I_{640} - I_{641} = 2\eta \cdot m_R m_{s,v} \cos \theta(t)$$

and $$\Delta I_{646} = I_{642} - I_{643} = -2\eta \cdot m_R m_{s,h} \cos \psi(t).$$

For the serrodyne approach, the following substitutions of variables may be made:

$$\theta(t) \to \frac{2\pi \cdot n}{T} t + \phi$$

and $$\psi(t) \to \frac{2\pi \cdot n}{T} t + \phi.$$

Again, ϕ can represent contributions to the phase that do not arise from the modulation and can be assumed to vary slowly with respect to time. Because frequency is the first time-derivative of phase, the frequency of modulation can be defined as:

$$\Omega \equiv \frac{2\pi \cdot n}{T}$$

and thus the difference currents (i.e., the electric detection signals 644 and 646) can be expressed as:

$$\Delta I_{644} = 2\eta m_R m_{s,v} \cos(\Omega t + \phi)$$

and $$\Delta_{646} = -2\eta m_R m_{s,h} \cos(\Omega t + \phi).$$

Similar to the sinusoidal approach, the phase ϕ can be determined and the magnitudes of the signal fields, $m_{s,v}$ and $m_{s,h}$, can be isolated from the phase by utilizing quadrature demodulation at the frequency Ω. In this approach, the processing circuitry 440 may be configured to perform an element-wise multiplication of each difference current against synthesized waveforms cos(Ωt) and sin(Ωt). After low-pass filtering to remove high-frequency content, the resulting in-phase, I(t), and quadrature, Q(t), components of the difference current $\Delta I_{644}$ are:

$$Q(t) = \eta m_{s,v} m_R \cos \phi$$

and $$I(t) = -\eta m_{s,v} m_R \sin \phi.$$

Similarly, for the difference current $\Delta I_{646}$, the components are:

$$Q(t) = -\eta m_{s,h} m_R \cos \phi$$

and $$I(t) = \eta m_{s,h} m_R \sin \phi.$$

These components may then be processed to reveal the real-time amplitude and phase of the signal-of-interest using these relations. For the difference current $\Delta_{644}$, the processed amplitude and phase may take the form:

$$\sqrt{I^2+Q^2} = \eta m_{s,v} m_R$$

and $$\tan^{-1}\left(\frac{-I}{Q}\right) = \phi.$$

Likewise, for the difference current $\Delta I_{644}$, the processed amplitude and phase may take the form:

$$\sqrt{I^2+Q^2} = \eta m_{s,h} m_R$$

and $$\tan^{-1}\left(\frac{-I}{Q}\right) = \phi.$$

The quantities $\eta$ and $m_R$ may be assumed to be time-independent, and therefore the time-dependence of the computed amplitudes, $m_{s,v}$ and $m_{s,h}$, may be determined solely by changes in the magnitude of the signal field. As with the case of the sinusoidal modulation described previously, the phase of the signal-of-interest, $\phi$, is a modulo 2× component. Again, a fringe-counting phase accumulator such as phase accumulator 850 may be employed to remove the artificial modulo 2π wrapping effect.

Figure 9:
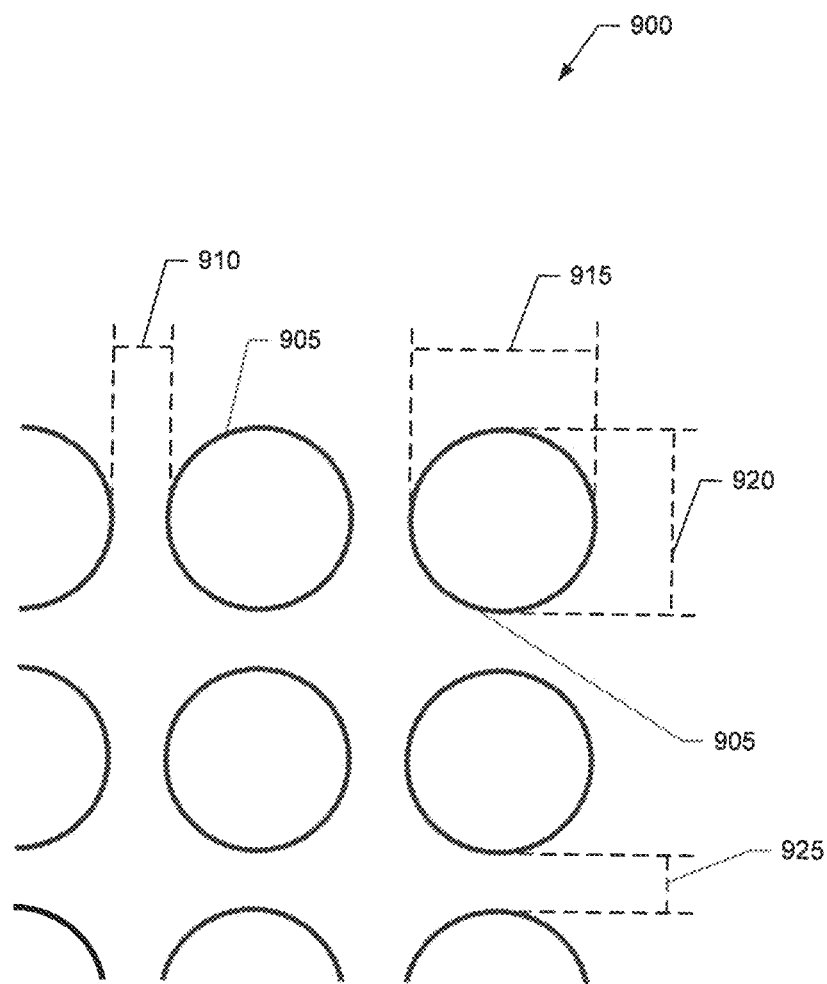
FIG. 9 is an illustration of a plurality of collectors of a portion of a photoreceiver array according to some example embodiments.

The description above generally describes the use of an array of photoreceivers to facilitate improvement of the SNR for a received signal and the principles that support such an approach. FIG. 9 illustrates aspects of the size and spacing dimensions for the collectors of the photoreceivers according to some example embodiments. In this regard, FIG. 9 shows a portion of a photoreceiver array 900 with circular-shaped collectors 905. As described above, each photoreceiver may include a respective collector configured to receive a portion of the speckle pattern formed via the object 433.

The photoreceiver array 900 may include collectors 905 that, according to some example embodiments, are spaced across (e.g., evenly) a planar surface of the optical receiver (e.g., optical receiver 430 or 600). In this regard, according to some example embodiments, the collectors 905 may have a cross-sectional area for receiving a respective portion of a speckle pattern that is defined by a diameter 915. The area of the collector 905 may be defined based on the area of a speckle pattern as described herein. In example embodiments where the cross-sectional area of the collector 905 is a circle, the diameter (shown as a width 915) may be sufficient to define the area. However, in some example embodiments, where, for example, the cross-sectional area of the collector 905 is in the shape of an oval, square, or rectangle, different or additional dimensions may be defined for describing the area of the collector 905. For a square, the width 915 may be described by the side of the square and may therefore be sufficient to describe the area. Alternatively, for a rectangle or an oval, more than one parameter may be needed to describe the area such as, for example, the height 920 and the width 915.

Additionally, according to some example embodiments, distances between the collectors 905 may be defined. In this regard, according to some example embodiments, the distances between collectors 905 may be uniform such that spacing is the same across the array 900, both vertically and horizontally. However, according to some example embodiments, the horizontal distance 910 between the collectors 905 may be a width 910 and a vertical distance between the collectors may be a height 925. According to some example embodiments, the distances between the collectors 905 may be based on an inter-speckle separation distance.

According to example embodiments, the dimensions and area of collector 905 may be selected for use based on characteristics of the speckles within the speckle pattern as described above. The size of the speckles may be based on a wavelength of input beam provided by the light source (e.g., light source 410), a size (e.g., cross-sectional area) of a beam of the input beam, and a distance between the scattering medium and the surface upon which the speckle pattern is formed for detection. In practice, with regard to a particular scattering medium such as a volume of tissue or a volume of water, etc., the characteristic dimensions of an ensemble of speckles may be measured, for example, by observing the speckle field using an incoherent focal plane array (such as a charge-coupled device (CCD) camera) located at the observation plane where the collector 905 may be placed. Based on these and possibly other parameters, various characteristics may be determined, such as, a character size of a speckle, an inter-speckle separation distance, and a speckle diameter. For example, using an empirical approach, a CCD camera may be used to measure the speckle field to determine characteristics such as speckle character size, speckle diameter, and inter-speckle separation distances. For example, based on repeated measurements, these and other characteristics may be determined. In this regard, a speckle character size may be determined as an aggregate speckle character size (e.g., a mean or average speckle character size), a speckle diameter may be determined as an aggregate speckle diameter (e.g., a mean or average speckle diameter), or an inter-speckle separation distance may be determined as an aggregate inter-speckle distance (e.g., a mean or average speckle diameter). Such characteristics may be used as sizing and spacing parameters for the collectors 905 of a photoreceiver array. As such, size or area of each of the collectors 905 may be defined based on the speckle character size, which may be defined as a mean or average size of the speckle in the speckle pattern. Additionally or alternatively, the diameter of each of the collectors 905 may be defined based on the speckle diameter, which may be defined as a mean or average diameter of the speckle in the speckle pattern. Further, the distances between the collectors 905 may be defined based on, for example, the inter-speckle separation distance or again the speckle diameter, or averages or means of the same.

In view of the foregoing, the area of the collectors 905 and the spacing between the collectors 905 may be selected when constructing the array 900. In this regard, according to some example embodiments, the area of a collector 905 may be selected based on the dimensions of the speckle within a speckle pattern. As such, according to some example embodiments, the area of a collector 905 may be equal to or larger than the area of a speckle. In other words, where a circular context is used, the diameter of a collector 905 may be equal to or larger than a speckle diameter (e.g., a mean speckle diameter).

Based on the forgoing, one objective for constructing the collector 905 may be to maximize the amount of light received by the collector 905 from a single speckle lobe. More specifically, according to some example embodiments where the collectors 905 are optical fiber waveguides (e.g., single-mode collector waveguide), the collector 905 may be configured to maximize the amount of light from a single speckle lobe that is launched into the core of the optical fiber waveguide. A number of different options may be employed to optimize the receipt of light by the collector 905.

For example, consider a scenario where the wavelength of interest is 1550 nm and the mean speckle diameter is about 10 microns. In this case, an optimal collector may comprise a cleaved end of a standard telecommunications-grade single-mode fiber (SMF-28 or SMF-28e), because the 1/e diameter of the fundamental mode of such a fiber is about 10 microns. However, if the mean speckle diameter is 1 mm, then an optimal collector may be configured to de-magnify the 1 mm speckle lobe to match the 10-micron fiber mode. As such, the optimal collector for a 1550 nm wavelength of interest and a 1 mm mean speckle diameter may comprise a convex lens having, for example, a clear aperture of 1 mm with a focal length of about 5 mm, located one focal length in front of (upstream of) the cleaved end of the optical fiber.

Alternatively, according to some example embodiments, a collector 905 may comprise a single-mode waveguide integrated in a chip (e.g., a silicon chip). Coupling speckle-light to a chip-based waveguide may be analogous to coupling light from an optical fiber to the chip waveguide as described above. According to some example embodiments, light of a speckle lobe may be launched into the chip-based waveguide using an integrated grating coupler (GC). The GC may be an optical grating, which may be integrated into a device layer of the chip. Further the GC may comprise finely spaced alternating ridges of high-refractive-index and low-refractive-index ridges, spaced at the appropriate pitch to scatter near-normal-incidence light (e.g., light arriving at the chip parallel to the normal vector describing the plane of the chip). According to some example embodiments, the ridges need not include straight lines, but rather may be shaped, for example, as parabolas to focus the scattered light to the entrance facet of the silicon waveguide. In this example, the collector 905 may comprise a grating coupler, which may be custom designed and optimized to scatter a speckle into the mode of the chip waveguide. Additionally or alternatively, a hybrid approach may be employed where collectors 905 are formed as an array of lenses that de-magnify a speckle field onto an array of chip-based grating couplers.

Additionally, the distance between the collectors 905 may also be defined based on the dimensions of the speckles within the speckle pattern. In this regard, for example, the distance between the collectors 905 (e.g., the pitch of the array 900) may be equal to or larger than an inter-speckle separation distance (e.g., a mean inter-speckle separation distance). According to some example embodiments, an inter-speckle separation distance within the speckle pattern may be determined or measured and the distance between the collectors 905 (e.g., the pitch of the array 900) may be approximately equal to the inter-speckle separation difference. Additionally, according to some example embodiments, the spacing between the collectors 905 may be based on the speckle diameter, and the spacing may be larger than the speckle diameter.

According to various example embodiments, due to the size and spacing requirements as well as the optical configuration and processing, the optical receiver 430 or 600 may be packaged on a single semiconductor chip (e.g., a silicon-based chip) with integrated photonics (e.g., on a single photonic chip) as mentioned above. In this regard, with reference to optical receiver 600, the splitters 610 and 620 and the components of each of the plurality of photoreceivers (e.g., photoreceiver 630) in the photoreceiver array may be constructed on a single chip. In particular, the splitters and photodiodes of the photoreceiver 630 may be constructed in a manner that can allow for significant scaling of the numbers of photoreceivers within a single chip package. Such a small-scale solution may be advantageous for a variety of applications including applications for biological tissue analysis such as analyzing changes and activity in active brain tissue. Additionally, such a chip-based solution may also benefit from reduced environmental noise due to the inclusion of rigidly affixed waveguides. Further, a chip-based solution may also benefit from reduced environmental noise due to thermal transients. Such thermal transients may be reduced or eliminated in chip-based solutions due to thermal controls, such as, for example, heat sinks or the like.

Figure 10:
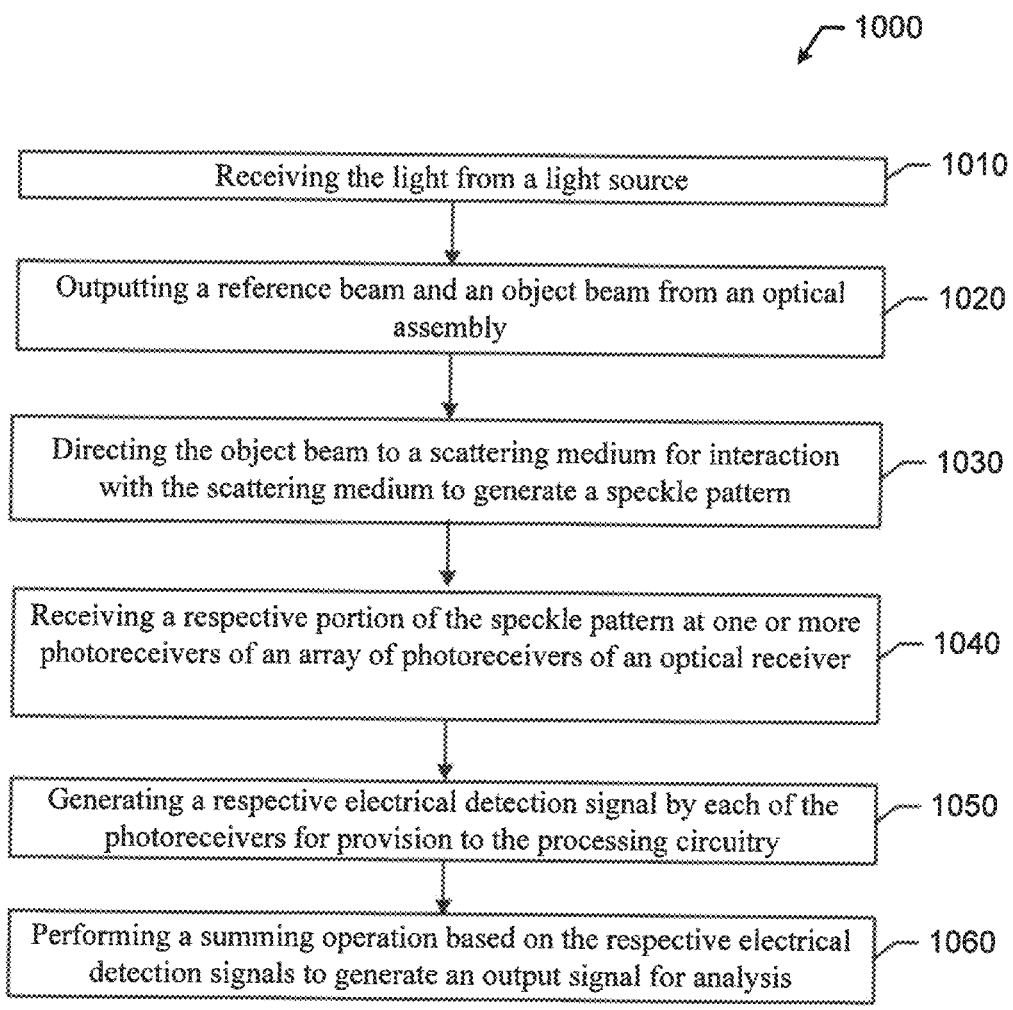
FIG. 10 is a flowchart of an example method for generating imaging output signals based on light that has interacted with a scattering object according to some example embodiments.

FIG. 10 shows a flowchart of an example method 1000 that may be implemented, for example, by the system 400 or components thereof according to some example embodiments. As such, the example method 1000 may include, at 1010, receiving light from a light source. The light may be received, for example, by the optics assembly 420 as the input beam 412 from the light source 410. Further, the example method 1000 may include, at 1020, outputting a reference beam and an object beam from an optical assembly. In this regard, based on the light from the light source, an optics assembly may be configured to output a reference beam and an object beam. According to some example embodiments, the optics assembly 420 may receive the input beam 412 and act upon the input beam 412, as described above, to generate an object/reference output 422 that comprises an object beam and a reference beam. Further, according to some example embodiments, the reference beam or the object beam may be modulated.

The example method 1000 may further include directing the object beam to a scattering medium for interaction with the scattering medium to generate a speckle pattern at 1030. In this regard, for example, the optical receiver 430 may be configured to split the object beam 432 from the reference beam 602 and direct the object beam 432 at the object 433 using, for example, optical components. Further, the example method 1000 may include, at 1040, receiving a respective portion of the speckle pattern at one or more photoreceivers of an array of photoreceivers of an optical receiver. In this regard, the speckle pattern may be received in response to the object beam 432 interacting, either in a transmission configuration or a reflective configuration, with the object 433 to generate the speckle pattern. The photoreceiver array 436 may receive the speckle pattern such that a portion (e.g., speckle-sized portions) of the speckle pattern may be received by each photoreceiver in the array.

According to some example embodiments, the example method 1000 may further include, at 1050, generating respective electrical detection signals by each of the photoreceivers for provision to the processing circuitry. In this regard, each photoreceiver of the photoreceiver array 436 may be configured to generate respective electrical detection signals 438 for delivery to the processing circuitry 440. According to some example embodiments, the example method 1000 may also include, at 1060, performing a summing operation based on the respective electrical detection signals to generate an output signal for analysis. In this regard, for example, the processing circuitry 440 may be configured to perform the summing operation.

According to some example embodiments, performing the summing operation may include performing a coherent summing operation based on the respective electrical detection signals 438 to generate the output signal comprising amplitude and phase information for analysis. Additionally or alternatively, the example method 1000 may include determining respective amplitudes based on each of the respective electrical detection signals 438. In this regard, each of the respective electrical detection signals 438 may include an in-phase and quadrature component. Further, in this regard, performing the summing operation may include performing a coherent summing operation based on the respective amplitudes to generate the output signal for analysis.

Additionally or alternatively, the example method 1000 may include modulating the reference beam or the object beam at a first polarization by applying a frequency shift. Alternatively, according to some example embodiments, a phase of the reference beam or the object beam may be modulated. Alternatively, according to some example embodiments, a frequency of the reference beam or the object beam may be modulated. Further, according to some example embodiments, an area of a collector may be larger than a speckle diameter corresponding to, for example, the scattering medium. Further, according to some example embodiments, a distance between the collector and another collector in the array of photoreceivers may be larger than the speckle diameter or based on an inter-speckle separation distance. The speckle diameter according to some example embodiments, may be a mean diffraction-limited speckle diameter.

Figure 11:
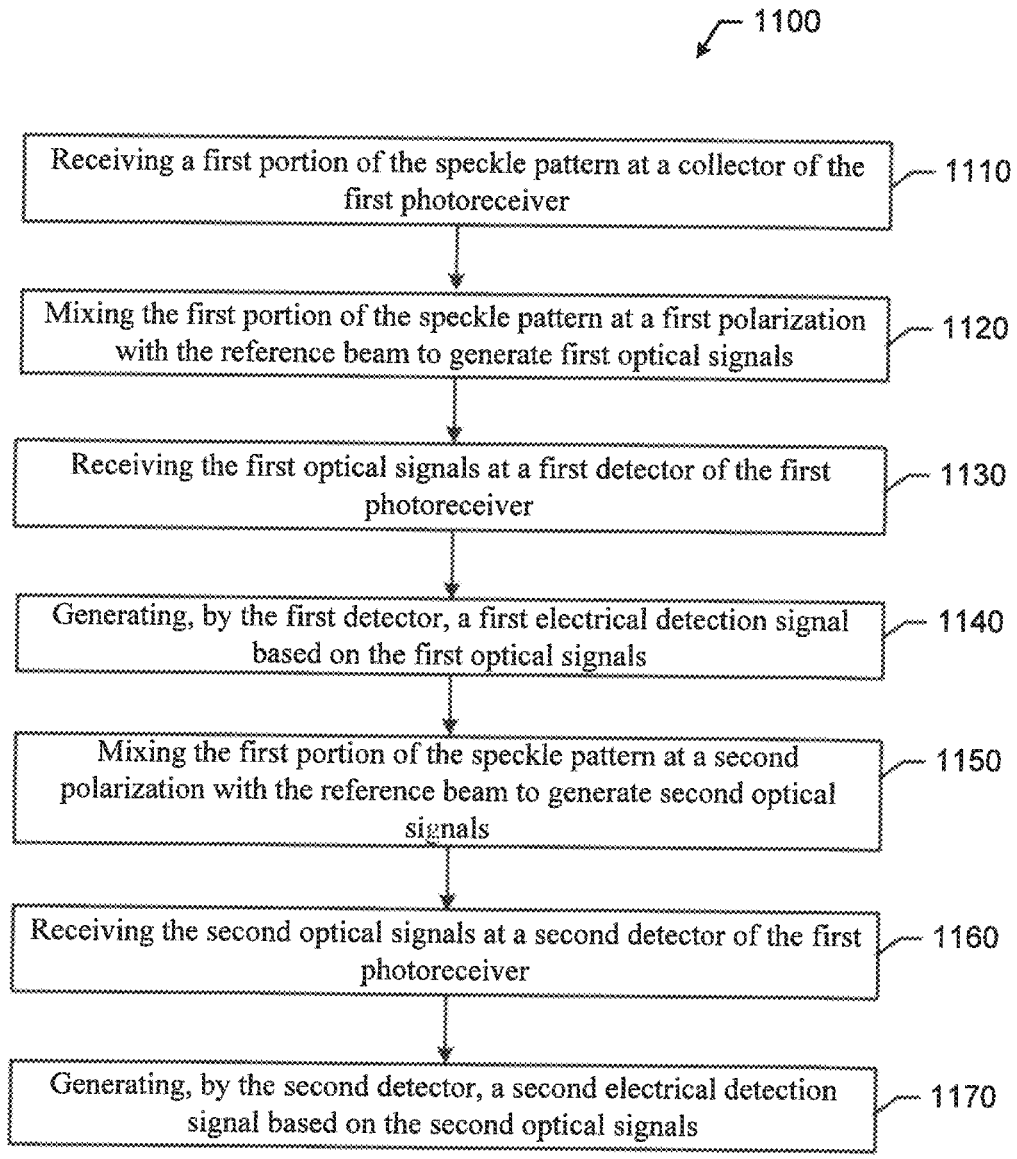
FIG. 11 is a flowchart of an example method performed by a photoreceiver to generate optical signals for analysis according to some example embodiments.

Now with reference to FIG. 11, another example method 1100 is provided for generating electrical detection signals (e.g., electric detection signals 438). According to some example embodiments, the example method 1100 may be performed by an individual, first photoreceiver (e.g., photoreceiver 630 or photoreceiver 700), where the first photoreceiver is one photoreceiver within a photoreceiver array. In this regard, according to some example embodiments, the example method 1100 may include receiving a first portion of the speckle pattern at a collector (e.g., collector 720) of the first photoreceiver, at 1110. The example method 1100 may further include, at 1120, mixing the first portion of the speckle pattern at a first polarization with the reference beam to generate first optical signals. In this regard, for example, the mixing may be performed by splitter 730 to generate optical signals 732 and 734 as the first optical signals. Further, according to some example embodiments, the example method 1100 may include receiving the first optical signals at a first detector of the first photoreceiver, at 1130. Accordingly, the detector 750 of the photoreceiver 700 may be configured to receive the optical signals 732 and 734. Additionally, the example method 1110 may include, at 1140, generating, by the first detector, a first electrical detection signal based on the first optical signals. In this regard, the first electrical detection signal may be a first component of the respective electrical detection signals for the first photoreceiver. Accordingly, the detector 750 may be configured to generate the first electrical detection signal 752 based on the optical signals 732 and 734.

Further, at 1150, the example method may include mixing the first portion of the speckle pattern at a second polarization with the reference beam to generate second optical signals. In this regard, for example, the mixing may be performed by splitter 740 to generate optical signals 742 and 744 as the second optical signals. Further, according to some example embodiments, the example method 1100 may include receiving the second optical signals at a second detector of the first photoreceiver, at 1160. Accordingly, the detector 760 of the photoreceiver 700 may be configured to receive the optical signals 742 and 744. Additionally, the example method 1110 may include, at 1170, generating, by the second detector, a second electrical detection signal based on the second optical signals. In this regard, the second electrical detection signal may be a second component of the respective electrical detection signals for the first photoreceiver. Accordingly, the detector 760 may be configured to generate the second electrical detection signal 762 based on the optical signals 742 and 744.

In some embodiments of the example methods described above, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments.

The embodiments presented herein are provided as examples and therefore the disclosure is not to be limited to the specific embodiments disclosed. Modifications and other embodiments are intended to be included within the scope of the appended claims. Moreover, although the foregoing descriptions and the associated drawings describe example embodiments in the context of certain example combinations of elements and/or functions, different combinations of elements and/or functions may be used to form alternative embodiments. In this regard, for example, different combinations of elements and/or functions other than those explicitly described above are also contemplated. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments.

That which is claimed:

1. A system comprising:
   a light source configured to output light; and
   an optics assembly configured to receive the light from the light source and output a reference beam and an object beam, the reference beam or the object beam being modulated and the object beam being directed to a scattering medium for interaction with the scattering medium to generate a speckle pattern;
   processing circuitry;
   an optical receiver comprising an array of photoreceivers including a first photoreceiver, each photoreceiver within the array of photoreceivers being configured to receive a respective portion of the speckle pattern and generate respective electrical detection signals for provision to the processing circuitry;
   wherein the processing circuitry is configured to perform a summing operation based on the respective electrical detection signals to generate an output signal for analysis;
   wherein the first photoreceiver comprises:
   a collector configured to receive a first portion of the speckle pattern;
   a first detector and a second detector;
   a first splitter configured to mix the first portion of the speckle pattern at a first polarization with the reference beam to generate first optical signals for receipt by the first detector, the first detector being configured to generate a first electrical detection signal based on the first optical signals for provision to the processing circuitry;

a second splitter configured to mix the first portion of the speckle pattern at a second polarization with the reference beam to generate second optical signals for receipt by the second detector, the second detector being configured to generate a second electrical detection signal based on the second optical signals for provision to the processing circuitry;

wherein the first electrical detection signal and the second electrical detection signal are included in the respective electrical detection signals for provision to the processing circuitry.

2. The system of claim 1, wherein the collector comprises a cleaved optical fiber.

3. The system of claim 1, wherein the collector comprises a photonic waveguide.

4. The system of claim 1, wherein an area of the collector is larger than a speckle diameter corresponding to the scattering medium.

5. The system of claim 1, wherein a distance between the collector and another collector in the array of photoreceivers is larger than a speckle diameter.

6. The system of claim 1, wherein the processing circuitry is configured to perform the summing operation as a coherent summing operation based on the respective electrical detection signals to generate the output signal for analysis.

7. The system of claim 1, wherein the processing circuitry is configured to determine respective amplitudes for each photoreceiver based on the respective electrical detection signals; and wherein the processing circuitry is configured to perform the summing operation as a coherent summing operation based on the respective amplitudes to generate the output signal for analysis.

8. The system of claim 1, wherein the optics assembly is configured to modulate the reference beam or the object beam by applying a frequency shift, modulating a phase of the reference beam or the object beam, or modulating a frequency of the reference beam or the object beam.

9. The system of claim 1, wherein the optical receiver is disposed on a single photonic chip.

10. An optical receiver comprising:

an array of photoreceivers including a first photoreceiver, each photoreceiver within the array of photoreceivers being configured to receive a respective portion of a speckle pattern generated by interaction between an object beam and a scattering medium and generate respective electrical detection signals for provision to processing circuitry for summing;

wherein the optical receiver is configured to receive a reference beam and the speckle pattern;

wherein the first photoreceiver of the array of photoreceivers comprises:

a collector configured to receive a first portion of the speckle pattern;

a first detector and a second detector, a first optical splitter configured to mix the first portion of the speckle pattern at a first polarization with the reference beam to generate first optical signals for receipt by the first detector, the first detector being configured to generate a first electrical detection signal based on the first optical signals for provision to the processing circuitry;

a second optical splitter configured to mix the first portion of the speckle pattern at a second polarization with the reference beam to generate second optical signals for receipt by the second detector, the second detector being configured to generate a second electrical detection signal based on the second optical signals for provision to the processing circuitry;

wherein the first electrical detection signal and the second electrical detection signal are included in the respective electrical detection signals for provision to the processing circuitry.

11. The optical receiver of claim 10, wherein the collector comprises a cleaved optical fiber.

12. The optical receiver of claim 10, wherein the collector comprises a photonic waveguide.

13. The optical receiver of claim 10, wherein an area of the collector is larger than a speckle diameter corresponding to the scattering medium.

14. The optical receiver of claim 10, wherein a distance between the collector and another collector in the array of photoreceivers is larger than a speckle diameter.

15. The optical receiver of claim 10, wherein the optical receiver is disposed on a single photonic chip.

16. A method comprising:

receiving light from a light source;

outputting a reference beam and an object beam from an optical assembly, the reference beam or the object beam being modulated;

directing the object beam to a scattering medium for interaction with the scattering medium to generate a speckle pattern;

receiving a respective portion of the speckle pattern at one or more photoreceivers of an array of photoreceivers of an optical receiver;

generating respective electrical detection signals by each of the photoreceivers for provision to processing circuitry; and performing a summing operation based on the respective electrical detection signals to generate an output signal for analysis;

wherein generating the respective electrical detection signals for a first photoreceiver of the array of photoreceivers comprises:

receiving a first portion of the speckle pattern at a collector of the first photoreceiver;

mixing the first portion of the speckle pattern at a first polarization with the reference beam to generate first optical signals;

receiving the first optical signals at a first detector of the first photoreceiver;

generating, by the first detector, a first electrical detection signal based on the first optical signals;

mixing the first portion of the speckle pattern at a second polarization with the reference beam to generate second optical signals;

receiving the second optical signals at a second detector of the first photoreceiver, and generating, by the second detector, a second electrical detection signal based on the second optical signals; and wherein the first electrical detection signal and the second electrical detection signal are included in the respective electrical detection signals for provision to the processing circuitry.

17. The method of claim 16, wherein performing the summing operation includes performing a coherent summing operation based on the respective electrical detection signals to generate the output signal for analysis.

18. The method of claim 16, further comprising determining respective amplitudes for each photoreceiver based on the respective electrical detection signals; and
    wherein performing the summing operation includes performing a coherent summing operation based on the respective amplitudes to generate the output signal for analysis.

19. The method of claim 16, further comprising modulating the reference beam or the object beam by applying a frequency shift, modulating a phase of the reference beam or the object beam, or modulating a frequency of the reference beam or the object beam.

20. The method of claim 16, wherein an area of the collector is larger than a speckle diameter corresponding to the scattering medium and a distance between the collector and another collector in the array of photoreceivers is larger the speckle diameter.

\* \* \* \* \*